(12) United States Patent
Puphal

(10) Patent No.: US 12,472,984 B2
(45) Date of Patent: Nov. 18, 2025

(54) METHOD, PROGRAM, STORAGE MEDIUM AND ASSISTANCE SYSTEM FOR ASSISTING EGO-AGENT AND VEHICLE

(71) Applicant: Honda Motor Co., Ltd., Tokyo (JP)

(72) Inventor: Tim Puphal, Offenbach (DE)

(73) Assignee: Honda Motor Co., Ltd., Tokyo (JP)

(*) Notice: Subject to any disclaimer, the term of this patent is extended or adjusted under 35 U.S.C. 154(b) by 223 days.

(21) Appl. No.: 18/474,236

(22) Filed: Sep. 26, 2023

(65) Prior Publication Data
US 2025/0100584 A1    Mar. 27, 2025

(51) Int. Cl.
*B60W 60/00* (2020.01)
*B60W 30/09* (2012.01)
*B60W 50/14* (2020.01)

(52) U.S. Cl.
CPC ........ *B60W 60/0016* (2020.02); *B60W 30/09* (2013.01); *B60W 50/14* (2013.01); *B60W 2420/403* (2013.01); *B60W 2554/80* (2020.02)

(58) Field of Classification Search
CPC .. B60W 60/0016; B60W 30/09; B60W 50/14; B60W 2554/80; B60W 2420/403
USPC .......................................................... 701/24
See application file for complete search history.

(56) References Cited

U.S. PATENT DOCUMENTS

| | | | |
|---|---|---|---|
| 7,065,432 B2 | 6/2006 | Moisel et al. | |
| 7,778,770 B2 | 8/2010 | Sakagami et al. | |
| 8,493,195 B2 | 7/2013 | Lee | |
| 8,562,156 B2 | 10/2013 | Yinko, Jr. et al. | |
| 8,885,039 B2 | 11/2014 | Jang et al. | |

(Continued)

FOREIGN PATENT DOCUMENTS

| | | | | |
|---|---|---|---|---|
| CN | 102037458 | | 4/2011 | |
| CN | 113228135 B | * | 8/2022 | ............. H04N 23/80 |

(Continued)

OTHER PUBLICATIONS

Buckman, Noam, et al., "Generating Visibility-Aware Trajectories for Cooperative and Proactive Motion Planning", 2020, IEEE International Conference on Robotics and Automation (ICRA), pp. 3220-3226 (Year: 2020).*

(Continued)

*Primary Examiner* — Hunter B Lonsberry
*Assistant Examiner* — Helen Li
(74) *Attorney, Agent, or Firm* — JCIPRNET

(57) ABSTRACT

The disclosure relates to a computer-implemented method for assisting an ego-agent, the method comprising: estimating a visibility area of another agent being present in an environment of the ego-agent; computing a visibility state of the other agent with regard to the ego-agent using the estimated visibility area of the other agent; estimating a collision risk between the ego-agent and the other agent using the computed visibility state of the other agent; planning a behavior of the ego-agent by minimizing a total cost for the behavior, wherein the total cost comprise the estimated collision risk; and performing at least one of: informing the ego-agent on the estimated collision risk and/or the planned behavior of the ego-agent; outputting, dependent on the estimated collision risk, a warning that the other agent is not aware of the ego-agent; and controlling the ego-agent using the estimated collision risk and/or the planned behavior of the ego-agent.

19 Claims, 14 Drawing Sheets

(56) References Cited

U.S. PATENT DOCUMENTS

| | | | |
|---|---|---|---|
| 9,367,065 | B2 | 6/2016 | Dolgov et al. |
| 9,463,797 | B2 | 10/2016 | Damerow et al. |
| 10,078,966 | B2 | 9/2018 | Kim et al. |
| 10,627,812 | B2 | 4/2020 | Eggert et al. |
| 12,269,462 | B1* | 4/2025 | Garimella .......... B62D 15/0285 |
| 2013/0147639 | A1 | 6/2013 | Wietfeld et al. |
| 2013/0338881 | A1 | 12/2013 | Sato et al. |
| 2014/0074356 | A1 | 3/2014 | Bone et al. |
| 2015/0203023 | A1 | 7/2015 | Marti et al. |
| 2017/0076605 | A1* | 3/2017 | Suzuki ................... G08G 1/133 |
| 2017/0357859 | A1* | 12/2017 | Jain ....................... G06V 40/161 |
| 2018/0236939 | A1 | 8/2018 | Smith |
| 2019/0359218 | A1* | 11/2019 | Pohl .................. B60W 30/0956 |
| 2020/0126421 | A1* | 4/2020 | Zhang ..................... H04W 4/44 |
| 2020/0168098 | A1 | 5/2020 | Huang |
| 2020/0189581 | A1* | 6/2020 | Yang ................. B60W 30/0956 |
| 2020/0231149 | A1 | 7/2020 | Eggert et al. |
| 2021/0134156 | A1* | 5/2021 | Lee ........................ G08G 1/166 |
| 2021/0166564 | A1* | 6/2021 | Takaki ................... G08G 1/166 |
| 2021/0261059 | A1 | 8/2021 | Baur |
| 2021/0271249 | A1* | 9/2021 | Kobashi ................. G06V 20/58 |
| 2022/0316897 | A1 | 10/2022 | Eggert et al. |
| 2024/0124011 | A1* | 4/2024 | Alzuhd ................. B60W 50/14 |

FOREIGN PATENT DOCUMENTS

| | | | |
|---|---|---|---|
| DE | 102015213594 | | 1/2017 |
| WO | WO-2023170703 A1 * | 9/2023 | ............. G08G 1/167 |

OTHER PUBLICATIONS

Tim Puphal et al., "Driver Assistance System and Vehicle Including the Driver Assistance System Based on Determining a Perceived Situation From Multiple Possible Situations," Unpublished U.S. Appl. No. 18/190,932, filed Mar. 27, 2023.

* cited by examiner

METHOD, PROGRAM, STORAGE MEDIUM AND ASSISTANCE SYSTEM FOR ASSISTING EGO-AGENT AND VEHICLE

BACKGROUND

Technical Field

The present disclosure relates to the field of assisting an ego-agent. In particular, a method for assisting an ego-agent, a corresponding program comprising program code, a corresponding non-transitory computer readable storage medium, an assistance system for assisting an ego-agent, and a vehicle including such an assistance system are proposed.

Related Art

Document U.S. Pat. No. 9,463,797 B2 discloses a method and vehicle with an advanced driver assistance system for risk-based traffic scene analysis. Document U.S. Pat. No. 10,627,812B2 discloses a risk based driver assistance for approaching intersections of limited visibility. US 2020/0231149A1 discloses a method for assisting a driver, a driver assistance system, and a vehicle including such driver assistance system. Document U.S. Ser. No. 18/190,932 discloses a driver assistance system and a vehicle including the driver assistance system based on determining a perceived situation from multiple possible situations. Document U.S. Ser. No. 17/709,420 discloses an advanced driver assistance system for assisting a driver of a vehicle.

Especially, document U.S. Ser. No. 17/709,420 discloses a system for visualizing personal risk spaces. Document U.S. Ser. No. 17/709,420 discloses an advanced driver assistance system for assisting a driver of a vehicle. The system comprises a sensor unit, a processing unit and a display unit. The sensor unit is configured to sense an environment of the vehicle and provide a sensing output to the processing unit. The processing unit is configured to determine, based on the sensing output, at least one feature of the environment. The processing unit is configured to determine, for a current time, a risk zone of the feature, by: estimating, based on at least one parameter of the vehicle at the current time, at each virtual position of two or more virtual positions of the vehicle a respective risk with regard to the feature to estimate for the two or more virtual positions two or more risks; and forming the risk zone based on the two or more risks. The display unit is configured to display the environment of the vehicle with the feature and the risk zone of the feature.

In other words, document U.S. Ser. No. 17/709,420 discloses a processing unit that is configured to estimate, for a current time and based on at least one parameter of the vehicle at the current time, a theoretical risk with regard to a detected feature in the environment of the vehicle, assuming that the vehicle is not located at the actual position of the vehicle at the current time, but at a virtual position. A virtual position corresponds to an assumed position of the vehicle different from the actual position, and, thus, is a theoretical position. In particular, the two or more virtual positions comprise or correspond to positions that are different from each other and different from the actual position of the vehicle at the current time.

A risk zone may represent a dangerous area, in which the vehicle should not be at the current time. The risk zone of the feature may represent a personal (i.e., peripersonal) space of the feature. This allows the driver to intuitively recognize from the display unit a risk situation of the vehicle at the current time, based on the displayed environment of the vehicle, the displayed feature and the displayed risk zone of the feature, because every person has its own personal space that the person does not want to be invaded. Therefore, by indicating the personal space of the feature in the form of the risk zone to the driver, the driver may not only receive the information on the two or more estimated risks with regard to the feature from the display of the risk zone of the feature. The driver will also be aware of a personal space of the feature, which the person intuitively will put attention to due to the person's psychology. That is, the risk zone of the feature informs the driver on an area that the vehicle should not invade.

The system to visualize personal risk spaces of the document U.S. Ser. No. 17/709,420 is an example how to be able to visualize risks. The present disclosure, especially the disclosure with regard to visibility state sharing, may be put into the overall framework of the document U.S. Ser. No. 17/709,420. U.S. Ser. No. 17/709,420 would allow to visualize other drivers' visibility, which is a subject of this disclosure, in addition to the risk zone around the vehicles.

In the context of mobility there are different agents involved in an environment. For example, with regard to a road there may be different land vehicles, such as one or more cars, one or more bicycles, and one or more persons (e.g., pedestrians) moving in the area of the road. The term "street" may be used as a synonym for the term "road". An assisting system for assisting any one of these agents may help to warn the respective assisted agent from risk of collision with other agents. In this regard, an agent that is assisted may be referred to as "ego-agent". For example, a blind spot system in a car driven by a driver on a road may warn the driver of other agents of the road (e.g., a pedestrian, a bicycle or another car) being present in one of the blind spots of the car. A blind spot of the car is an area at the car with zero visibility of the driver driving the car. That is, any object that is present in a blind spot of the car cannot be visually perceived (e.g., directly, via a side mirror or back mirror) by the driver. The blind spots of a car may represent a blind spot area of the car.

Such a blind spot system however merely informs the driver of the car of the fact that there are agents in the environment of the car that cannot be visually perceived by the driver. That is, the one or more other agents being present in the blind spot may not know that they are present in a blind spot of the car and, thus, may not be aware that they are not seen by the driver of the car.

Many accidents may occur from human drivers overlooking critical traffic participants and no communication or miscommunication between human drivers.

SUMMARY

Therefore, it is an object of the present disclosure to provide an improved computer-implemented method for assisting an ego-agent. Especially, it may be an object to provide an improved computer-implemented method for assisting an ego-agent that allows improving an interaction between the ego-agents and other agent in an environment.

In a first aspect, the computer-implemented method according to independent claim 1 solves the aforementioned problem. The program according to a second aspect, the non-transitory computer-readable storage medium according to a third aspect, the assistance system according to a fourth aspect, and the vehicle according to a fifth aspect provide further advantageous solutions to the problem.

In the first aspect, the computer-implemented method for assisting an ego-agent, comprises estimating a visibility area of another agent being present in an environment of the ego-agent. The method further comprises computing a visibility state of the other agent with regard to the ego-agent using the estimated visibility area of the other agent. Furthermore, the method comprises estimating a collision risk between the ego-agent and the other agent using the computed visibility state of the other agent. The method further comprises planning a behavior of the ego-agent by minimizing a total cost for the behavior, wherein the total cost comprises the estimated collision risk. Furthermore, the method comprises performing at least one of: informing the ego-agent on the estimated collision risk and/or the planned behavior of the ego-agent; outputting, dependent on the estimated collision risk, a warning that the other agent is not aware of the ego-agent; and controlling the ego-agent using the estimated collision risk and/or the planned behavior of the ego-agent.

The method according to the first aspect provides an improved method for assisting the ego-agent because it considers the ability of another agent being present in the environment of the ego-agent to perceive the ego-agent for estimating a collision risk between the ego-agent and the other agent. Thus, the method according to the first aspect allows improving an interaction between the ego-agents and the other agent in the environment with regard to avoiding a collision between the ego-agent and the other agent.

The method according to the first aspect allows the ego-agent to be aware that the other agent may be overlooking the ego-agent. The method may result in an improved assistance of the ego-agent in any one of the following cases: an assistance system of the other agent is not functioning, the other agent does not have an assistance system, the other agent does not react to a warning of its assistance system with regard to a collision between the other agent and the ego-agent. In the aforementioned cases, a collision between the ego-agent and the other agent may be still avoided by the ego driver, because the method of the first aspect allows the ego-agent to know about a limited visibility state of the other agent with regard to the ego-agent in case the visibility state of the other agent is limited.

The dependent claims define further advantageous embodiments of the present disclosure.

The program according to the second aspect comprises program-code means for executing a method for assisting an ego-agent, when the program is executed on a computer or digital signal processor. The method comprises estimating a visibility area of another agent being present in an environment of the ego-agent. The method further comprises computing a visibility state of the other agent with regard to the ego-agent using the estimated visibility area of the other agent. Furthermore, the method comprises estimating a collision risk between the ego-agent and the other agent using the computed visibility state of the other agent. The method furthermore comprises planning a behavior of the ego-agent by minimizing a total cost for the behavior, wherein the total cost comprises the estimated collision risk. Furthermore, the method comprises performing at least one of: informing the ego-agent on the estimated collision risk and/or the planned behavior of the ego-agent; outputting, dependent on the estimated collision risk, a warning that the other agent is not aware of the ego-agent; and controlling the ego-agent using the estimated collision risk and/or the planned behavior of the ego-agent.

In other words, the program according to the second aspect comprises program-code means for executing the method according to the first aspect, e.g., operations according to one of the embodiments of the method according to the first aspect, when the program is executed on a computer or digital signal processor.

The non-transitory computer-readable storage medium according to the third aspect embodies a program of machine-readable instructions executable by a digital processing apparatus, which cause the digital processing apparatus to perform: estimating a visibility area of another agent being present in an environment of an ego-agent; computing a visibility state of the other agent with regard to the ego-agent using the estimated visibility area of the other agent; estimating a collision risk between the ego-agent and the other agent using the computed visibility state of the other agent; planning a behavior of the ego-agent by minimizing a total cost for the behavior, wherein the total cost comprise the estimated collision risk; and performing at least one of: informing the ego-agent on the estimated collision risk and/or the planned behavior of the ego-agent, outputting, dependent on the estimated collision risk, a warning that the other agent is not aware of the ego-agent, and controlling the ego-agent using the estimated collision risk and/or the planned behavior of the ego-agent.

In other words, the non-transitory computer-readable storage medium according to the third aspect embodies a program of machine-readable instructions executable by a digital processing apparatus, which cause the digital processing apparatus to perform the method according to the first aspect, e.g., operations according to one of the embodiments of the method according to the first aspect.

The program according to the third aspect includes program-code means for executing the steps according to one of the embodiments of the method according to the first aspect, when the program is executed on a computer or digital signal processor.

According to the third aspect, a non-transitory computer-readable storage medium embodies a program of machine-readable instructions executable by a digital processing apparatus, which cause the digital processing apparatus to perform operations according to one of the embodiments of the method according to the first aspect.

An assistance system according to the fourth aspect for assisting an ego-agent comprises a processor that is configured to estimate a visibility area of another agent being present in an environment of the ego-agent. The processor is configured to compute a visibility state of the other agent with regard to the ego-agent using the estimated visibility area of the other agent. The processor is configured to estimate a collision risk between the ego-agent and the other agent using the computed visibility state of the other agent. The processor is configured to plan a behavior of the ego-agent by minimizing a total cost for the behavior, wherein the total cost comprises the estimated collision risk. The processor is configured to perform at least one of: informing the ego-agent on the estimated collision risk and/or the planned behavior of the ego-agent, outputting, dependent on the estimated collision risk, a warning that the other agent is not aware of the ego-agent, and controlling the ego-agent using the estimated collision risk and/or the planned behavior of the ego-agent In other words, the assistance system according to the fourth aspect comprises a processor that is configured to perform the method according to the first aspect, e.g., operations according to one of the embodiments of the method according to the first aspect.

A vehicle according to the fifth aspect includes an assistance system according to the fourth aspect.

The vehicle may be any vehicle known in the art that may move on ground, near ground, in the air, in water and under water. The vehicle may be for example a land vehicle (such as a car, truck, bus, bicycle, motorbike, fork truck etc.), an air vehicle (such as plane, helicopter, drone, space vehicle etc.), a water vehicle (such as a boat, submarine etc.) and so on. The vehicle may be a vehicle that is configured to be operated by an operator present at the vehicle. Optionally, the vehicle may be a vehicle teleoperated by an operator that is not present at the vehicle. The vehicle may be a vehicle that is configured to autonomously move, such as an autonomous driving (AD) car.

BRIEF DESCRIPTION OF THE DRAWINGS

The description of embodiments refers to the enclosed figures, in which.

In the figures, corresponding elements have the same reference signs. The discussion of same reference signs in different figures is omitted where possible without adversely affecting comprehensibility.

DETAILED DESCRIPTION

Figure 1:
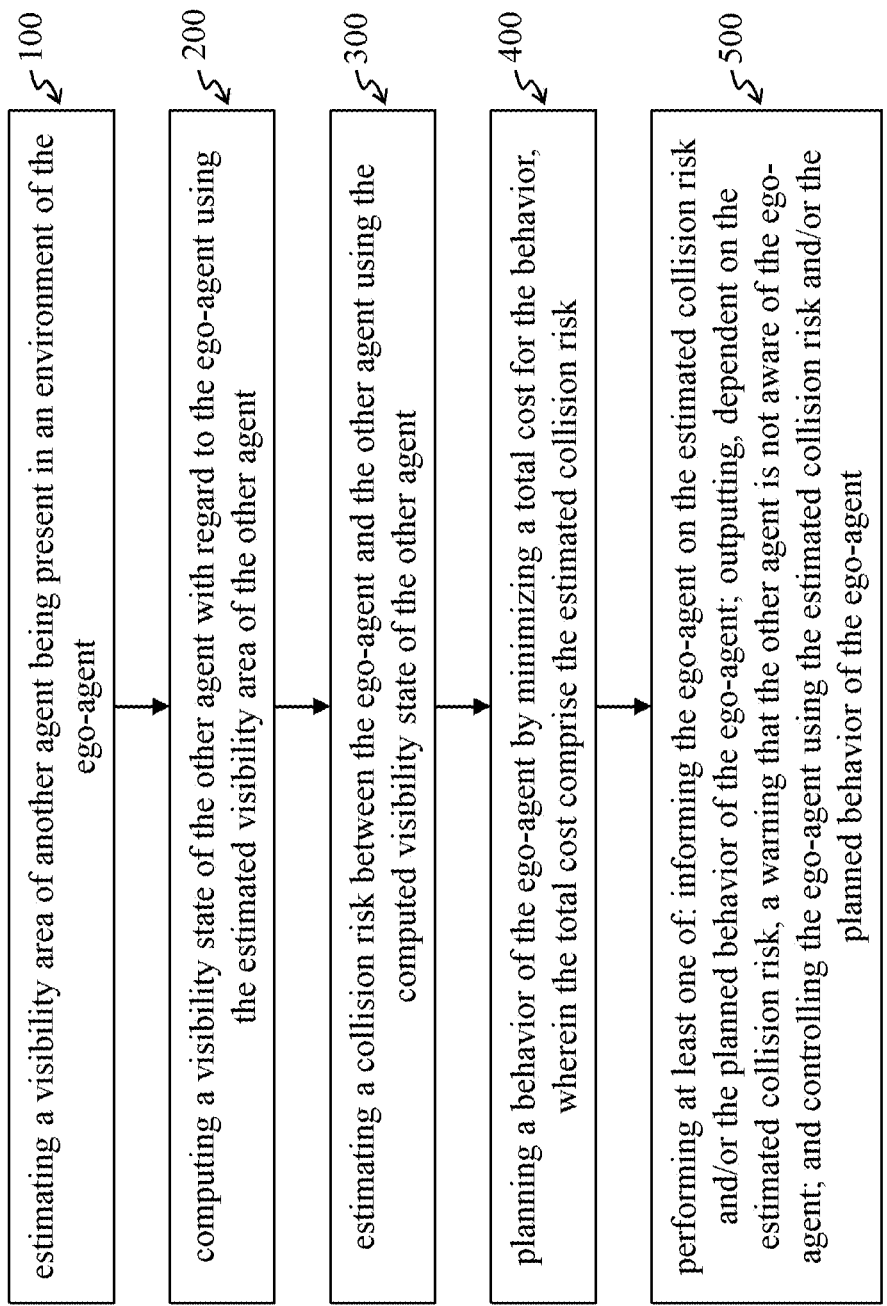
FIG. 1 shows a simplified flowchart of a method according to an embodiment.

The method according to the first aspect provides an advantageous solution to the aforementioned problem. The program according to the second aspect, the non-transitory computer-readable storage medium according to the third aspect, the assistance system according to the fourth aspect, and the vehicle according to the fifth aspect provide further advantageous solutions to the problem. The dependent claims define further advantageous embodiments of the present disclosure.

The method according to the first aspect may be performed by a processing unit, such as a computer. The ego-agent may be referred to by the term "agent".

The term "field of view" may be used as a synonym for the term "visibility area". The visibility area of an agent, such as the other agent or the ego-agent, may be understood as the area in which the agent is aware of other entities, such as further agents, obstacles etc. because it can perceive, e.g., visually perceive, the other entities. In other words, the visibility area of an agent is an area in which entities are visible for the agent. That is, an entity that is positioned outside the visibility area of the agent, e.g., the other agent or ego-agent, cannot be perceived, e.g., visually perceived, by the agent.

The visibility state of an agent with regard to a second agent, such as the visibility state of the other agent with regard to the ego-agent may be understood as a state indicating whether the second agent is perceived, e.g., visually perceived, by the agent or not.

The other agent may be a vehicle. The vehicle may be any vehicle known in the art that may move on ground, near ground, in the air, in water and under water. The vehicle may be for example a land vehicle (such as a car, truck, bus, bicycle, motorbike, fork truck etc.), an air vehicle (such as plane, helicopter, drone, space vehicle etc.), a water vehicle (such as a boat, submarine etc.) and so on. The terms "land craft", "aircraft" and "water craft" may be used as synonyms for the terms "land vehicle", "air vehicle" and "water vehicle", respectively.

Optionally, the other agent may be a vehicle operated by an operator present at the vehicle, i.e., a vehicle operated by a driver that is present in or on the vehicle. In this case the visibility area of the other agent is the visibility area of the operator, i.e., the visibility area of the driver of the vehicle. Optionally, the other agent may be a vehicle teleoperated by an operator that is not present at vehicle. In this case the visibility area of the other agent is the visibility area provided by one or more sensors of the vehicle for providing visual perception of an environment of the vehicle to the operator. Optionally, the other agent may be a vehicle that is configured to autonomously move, such as an autonomous driving (AD) car. In this case the visibility area of the other agent is the visibility area provided by one or more sensors of the vehicle for providing visual perception of an environment of the vehicle to the control entity of the vehicle. The control entity may comprise one or more control devices on board of the vehicle and/or one or more external control devices, e.g., an autonomous system. Herein, a control device may comprise at least one of a processor, a microprocessor, a controller, a microcontroller, application specific integrated circuits (ASIC), and field programmable gate array (FPGA). Optionally, the other agent may be a person (e.g., a pedestrian). In such a case the visibility area of the other agent is the visibility area of the eyes of the person.

The vehicle may be equipped with a motor, such as a combustion motor, an electric motor, a hybrid motor. In case the vehicle is an air vehicle, such as a plane, a description with respect to a road is correspondingly valid, when the air vehicle is moved on ground or near ground (e.g., helicopter flying near ground). In case the vehicle is an air vehicle, such as a plane, a description with respect to a road is correspondingly valid with regard to air corridors when the air vehicle is moving in the air. In case the vehicle is a water vehicle, such as a boat, a description with regard to a road is correspondingly valid with respect to water paths, such as water ways, water channels etc.

The above description with regard to the other agent is correspondingly valid for the ego-agent.

Estimating a collision risk between the ego-agent and the other agent using the computed visibility state of the other agent may comprise using one or more risk models, such as one or more stochastic risk models. The collision risk between the ego-agent and the other agent may be estimated using the current trajectories of the ego-agent and the other agent, the visibility state of the other agent and optionally the visibility state of the ego-agent.

For example, estimating the collision risk between the ego-agent and the other agent may comprise estimating a total collision risk $R_{total}$ that equals to a sum of a collision risk $R_{collision}$ due to other criteria than the visibility state of the other agent and a collision risk $R_{visibility}$ due to the visibility state of the other agent ($R_{total}=R_{collision}+R_{visibility}$). For example, the aforementioned criteria may comprise velocity of the ego-agent, velocity of other agent, direction of movement of ego-agent, direction of movement of other agent, environmental conditions (e.g., weather conditions, width and course of a road on which the ego-agent and the other agent may move on), planned behavior of ego-agent, planned behavior of other agent etc. For example, the collision risk $R_{visibility}$ due to the visibility state of the other agent may equal to a parameter k divided by the sum of one and the distance of the position of the ego-agent to the visibility area of the other agent ($R_{visibility}=k/(1+dist(pos_{ego}, visibility\ area_{other}))$). The parameter k is a scaling parameter that specifies the severity of the risk resulting from the visibility state. It can be seen as a weight how much the risk resulting from the visibility state will be considered in the total collision risk cost. The risk factor can be computed with other means, for example, by changing the prediction of the other agent due to its visibility state and computing the collision risk for this different prediction. Alternatively, instead of the collision risk $R_{visibility}$ due to the visibility state of the other agent a collision risk dependent on the visibility state of the other agent and the visibility state of the ego-agent may be used.

For example, in case the total collision risk $R_{total}$ is greater than a respective threshold ($R_{total}>R_{threshold,1}$) and the collision risk $R_{visibility}$ due to the visibility state of the other agent is greater than a respective threshold ($R_{visibility}>R_{threshold,2}$), a warning may be output to the ego-agent that the other agent is not aware of the ego-agent. The total collision risk $R_{total}$ may be referred to as the estimated collision risk, and the collision risk $R_{visibility}$ due to the visibility state of the other agent may be referred to as a risk factor computed using the computed visibility state of the other agent.

Planning a behavior of the ego-agent by minimizing a total cost for the behavior, wherein the total cost comprises the estimated collision risk, may comprise using a behavior-planning algorithm. The greater the estimated collision risk the greater the total cost may be and vice versa. That is, an optimal behavior of the ego-agent may be planned by minimizing the total cost for the behavior, wherein the total cost comprises the estimated collision risk. The step of planning the behavior of the ego-agent by minimizing the total cost for the behavior may comprise using a planning model to plan safe behaviors. For example, in case the ego-agent and the other agent are driving on a road, safe behaviors may be braking, following the lane etc. to avoid collisions.

The step of estimating the collision risk between the ego-agent and the other agent and the step of planning the behavior of the ego-agent may be performed by one or more control devices of the ego-agent and/or one or more external control devices, e.g., an autonomous system. In case of one or more external control devices, e.g., an autonomous system, performing the aforementioned steps, at least one of the estimated collision risk, costs, planned behavior (e.g., optimal behavior) of the ego-agent may be communicated (e.g., wirelessly) to the ego-agent. Herein any communication between two entities may be wirelessly and/or wired. Such communication may be done using respective communication devices at each of the two entities. Such communication may be done according to any known standard or protocol for communication. For example, such communication may comprise vehicle-to-vehicle communication (V2V communication) technologies and/or vehicle-to-infrastructure communication (V2I communication) technologies.

Optionally, the step of estimating the visibility area of the other agent and/or the step of computing the visibility state of the other agent may be performed by one or more control devices of the ego-agent and/or one or more external control devices, e.g., an autonomous system.

Optionally, the step of estimating the visibility area of the other agent and/or the step of computing the visibility state of the other agent may be performed at the other agent. In this case, a communication device of the other agent may transmit the estimated visibility area and/or the computed visibility state to a communication device of the ego-agent. The communication device of the other agent and the ego-agent may be configured for wireless and/or wired communication. The communication may be according to any known standard or protocol for communication. For example, the communication may comprise vehicle-to-vehicle communication (V2V communication) technologies and/or vehicle-to-infrastructure communication (V2I communication) technologies. In addition or alternatively, the communication device of the other agent may transmit the estimated visibility area and/or the computed visibility state to an autonomous system. The autonomous system may be configured to control the ego-agent, e.g., movement of the ego-agent.

The warning that the other agent is not aware of the ego-agent may be output to the ego-agent. The information that may be output to the ego-agent may comprise information on a safe behavior of the ego-agent that would reduce the collision risk, such as keeping distance to the other agent.

According to an embodiment of the method, estimating the visibility area of the other agent comprises estimating a direction of visual perception of the other agent, tracking history of the direction of visual perception of the other agent, and generating the visibility area using the tracked history of the direction of visual perception of the other agent.

For example, estimating a direction of visual perception of the other agent may comprise applying computer vision. The history of the direction of visual perception of the other agent may be tracked using a filter.

In case the other agent is a vehicle operated by an operator present at the vehicle, the direction of visual perception of the other agent is the direction of visual perception of the operator (e.g., of the eyes of the person operating the vehicle). For example, the direction of visual perception of the operator may be the direction of the gaze of the operator. In case the other agent is a vehicle teleoperated by an operator that is not present at the vehicle, the direction of visual perception of the other agent is the direction of visual perception provided by one or more sensors of the vehicle for providing visual perception of an environment of the vehicle to the operator. In case the other agent is a vehicle that is configured to autonomously move, the direction of visual perception of the other agent is the direction of visual perception provided by one or more sensors of the vehicle for providing visual perception of an environment of the vehicle to the control entity of the vehicle. In case the other agent is a person (e.g., a pedestrian), the direction of visual perception of the other agent is the direction of visual perception of the eyes of the person. For example, the direction of visual perception of the person may be the direction of the gaze of the person.

According to an embodiment of the method, estimating the visibility area of the other agent comprises using data of at least one of one or more cameras of the other agent pointing towards a face of an operator of the other agent, when the other agent is operated by the operator being present at the other agent; one or more sensors of the other agent sensing whether an operator of the other agent is aware of the ego-agent or is warned, when the other agent is operated by the operator being present at the other agent; one or more sensors of the other agent sensing an environment of the other agent, one or more cameras installed in an environment of the other agent; and one or more cameras of the ego-agent pointing towards a face of an operator of the other agent, when the other agent is operated by the operator being present at the other agent.

Herein, an operator may be a person or a humanoid robot. For example, in case the other agent is a car that is driven by the operator (e.g., person), the one or more cameras may be installed in the car such that the one or more cameras are pointing towards the face of the operator. For example, in case the other agent is a motorcycle that is driven by a person (being the operator), the one or more cameras may be arranged at (e.g., inside) a helmet worn by the person such that the one or more cameras are pointing towards the face of the operator.

Herein one or more sensors for sensing an environment or providing visual perception of an environment may comprise at least one of one or more cameras, one or more radar sensors, one or more Lidar sensors, one or more ultrasonic sensors, one or more infrared sensors, one or more presence and/or movement sensors and any other one or more sensors known in the art for sensing or visually perceiving an environment. The one or more sensors for sensing an environment or providing visual perception of an environment may comprise sensors used for adaptive cruise control.

For example, in case the ego-agent and the other agent are driving on a road, one or more cameras may be installed in the road infrastructure, e.g., on traffic light(s), road signs(s) etc. That is, the environment of the other agent may be a road.

Optionally, estimating the visibility area of the other agent comprises using data of one or more cameras of the ego-agent that are directed in the direction of the other agent. For example, in case the ego-agent is a car and the other agent is another car driven by a driver, the one or more cameras may be installed at the rear side of the car and perceive through the front window of the other car the driver of the other car, such as posture, face and/or direction of visual perception (e.g., direction of the gaze) of the driver. In this case, the data and the visibility area does not need to be transmitted to the ego-agent, because the one or more cameras are located at the ego-agent.

According to an embodiment of the method, estimating the visibility area of the other agent comprises applying ray casting from a position of the other agent; and reducing the visibility area of the other agent for areas that are occluded by objects in the environment of the other agent. The objects in the environment of the other agent may comprise for examples, walls, other vehicles, trees, buildings and so on.

According to an embodiment of the method, estimating the visibility area of the other agent comprises setting the visibility area to zero square meters, when the other agent is operated by a person or is a person and the person is either looking on a mobile device or talking to at least one other person.

According to an embodiment of the method, the method comprises estimating a visibility area of the ego-agent; computing a visibility state of the ego-agent with regard to the other agent using the estimated visibility area of the ego-agent; and estimating the collision risk between the ego-agent and the other agent using the computed visibility state of the other agent and the computed visibility state of the ego-agent.

In other words, the method may consider the visibility state of the ego-agent in addition to the visibility state of the other agent for estimating a collision risk between the ego-agent and the other agent. That is, the collision risk may be dependent on the combination of the visibility state of the ego-agent and the visibility state of the other agent. This may be advantageous, because in case the other agent is aware of the ego-agent a collision risk may still be great in case the ego-agent itself is not aware of the other agent. For example, in case the ego-agent and the other agent are each of vehicles that are driven by a driver on a road, the collision risk may be dependent on the combination of the visibility of the driver of the ego-vehicle and the visibility of the driver of the other vehicle. The collision risk may be for example at maximum when both drivers are not aware of each other.

According to an embodiment of the method, the visibility state of the other agent may comprise at least one of the following: a Boolean variable on whether the position of the ego-agent is within the estimated visibility area of the other agent (e.g. $pos_{ego} \in$ visibility $area_{other}$), a distance variable indicating a distance of the position of the ego-agent to the visibility area of the other agent (e.g. dist ($pos_{ego}$, visibility $area_{other}$)), and a probability variable of the other agent being aware of the ego-agent, the probability variable depending on the position of the ego-agent and the visibility area of the other agent (e.g. ($pos_{ego}$, visibility $area_{other}$)).

According to an embodiment of the method, computing a visibility state of the other agent with regard to the ego-agent using the estimated visibility area of the other agent comprises at least one of: combining the computed visibility state of the other agent with a confidence value of the estimate, and using at least one of a moving average, a hysteresis and an outlier compensation.

For example, the confidence value of the estimate may correspond to changes of the visibility state over time. Using at least one of a moving average, a hysteresis and an outlier compensation allows making the computed visibility state more robust.

According to an embodiment of the method, estimating a collision risk between the ego-agent and the other agent using the computed visibility state of the other agent comprises at least one of: predicting a behavior of the other agent using the computed visibility state of the other agent, and modifying the collision risk by a risk factor computed using the computed visibility state of the other agent.

For example, in case the ego-agent and the other agent are each of vehicles that are driven by a driver on a road, the driver of the other agent will more likely make a lane change when the driver of the other agent is not aware of the ego-vehicle. Such a lane change may result in a collision between the other vehicle and the ego-vehicle when the ego-vehicle drives on a lane to which the other vehicle changes to. Thus, a behavior of the other agent has an effect on the collision risk between the ego-agent and the other agent. This may be considered by modifying the collision risk with a risk factor computed using the computed visibility state of the other agent. The collision risk between the ego-agent and the other agent may be estimated by considering the predicted behavior of the other agent. For example, the risk factor may be computed using the predicted behavior of the other agent.

According to an embodiment of the method, the method comprises computing a risk factor using the computed visibility state of the other agent, and outputting a warning that the other agent is not aware of the ego-agent in case the estimated collision risk is greater than a threshold for the collision risk and the computed risk factor is greater than a threshold for the risk factor.

According to an embodiment of the method, the method comprises determining based on the estimated visibility area of the other agent and the position of the ego-agent whether the other agent is aware of the ego-agent; and performing at least one of: informing the ego-agent to use a visual signaling for signaling to the other agent in case the other agent is aware of the ego-agent and to use an acoustic signaling for signaling to the other agent otherwise; and controlling the ego-agent to use a visual signaling for signaling to the other agent in case the other agent is aware of the ego-agent and to use an acoustic signaling for signaling to the other agent otherwise.

According to an embodiment of the method, estimating a visibility area of the other agent comprises determining a blind spot area of the other agent using the shape of the other agent, and planning a behavior of the ego-agent by minimizing the total cost for the behavior comprises using a cost function that penalizes positions of the ego-agent in the blind spot area.

Determining a blind spot area of the other agent using the shape of the other agent may comprise estimating the blind spot area from geometries of the other agent. The blind spot area of the other agent comprises the blind spots of the other agent.

According to an embodiment of the method, informing the ego-agent and/or outputting the warning is performed using a human machine interface (HMI).

According to an embodiment of the method, informing the ego-agent and/or outputting the warning may be performed in at least one of a visual way, acoustic way and a way affecting the tactile sense. For example, a warning in an acoustic way may comprise outputting a warning sound. For example, informing the ego-agent and/or outputting the warning in a way effecting the tactile sense may comprise a vibrating steering wheel, in case the ego-agent is a vehicle comprising a steering wheel, such as a car, plane etc. For example, outputting the warning in a visual way may comprise one or more warning icons. For example, informing the ego-agent in a visual way may comprise highlighting the other agent in case it is not aware of the ego-agent. That is, entities that are present in the environment of the ego-agent, such as the other agent or one or more further agents that are not aware of the ego-agent may be highlighted. For example, the visibility area of the other agent or any other entities present in the environment of the ego-agent may be visualized on a display, for example with birds-eye-view.

Informing the ego-agent and/or outputting the warning may be done by a human machine interface (HMI). The HMI may comprise a display for informing and/or warning in a visual way. The HMI may comprise one or more loudspeakers for information and/or warning an acoustic way. The HMI may comprise one or more actuators, such as one or more vibrators (e.g., positioned in a steering wheel for driving the ego-agent), for informing and/or warning in a way affecting the tactile sense.

According to an embodiment of the method, the warning may be performed such that a warning modality and/or strength of a warning signaling depends on the estimated collision risk.

For example, the greater the estimated collision risk, the greater the strength of the warning signaling and vice versa.

Optionally, the other agent may be informed of the estimated collision risk and/or the planned behavior of the ego-agent (e.g., at the same time as the ego-agent). In addition or alternatively, the warning that the other agent is not aware of the ego-agent may be output dependent on the estimated collision risk to the other agent (e.g., at the same time as the ego-agent). In addition or alternatively, the other agent may be controlled using the estimated collision risk and/or the planned behavior of the ego-agent (e.g., at the same time as the ego-agent). The description with regard to informing the ego-agent and/or outputting the warning are correspondingly valid with regard to the other agent.

The description with regard to the ego-agent may be correspondingly valid for the other agent. The description with regard to the other agent may be correspondingly valid for the ego-agent.

In order to achieve the method according to the first aspect, some or all of embodiments and optional features of the first aspect, as described above, may be combined with each other.

According to an embodiment of the assistance system, the assistance system is configured to assist an operator of the ego-agent, in case the ego-agent is a vehicle being operated by the operator.

Optionally, the assistance system may be included in a portable device including a human machine interface (HMI) and carried by a user. The assistance system may be configured to assist the user via the HMI.

The assistance system may be a driver assistance system (DAS). Optionally, the assistance system may be an advanced driver assistance system (ADAS).

The processor of the assistance system may comprise one or more control devices at the ego-agent and/or one or more external control devices, e.g., an autonomous system. The one or more control devices at the ego-agent and the one or more external control device may be configured to communicate with each other. The description with regard to communication disclosed herein is correspondingly valid for this.

In case the processor uses for estimating the visibility area of the other agent data obtained by one or more sensors, e.g., one or more cameras, of the other agent, the assistance system may comprise a communication device for receiving the data. Optionally, the assistance system (e.g. the communication device) may transmit to the other agent or any other external entity (such as one or more further agents present in the environment of the ego-agent) at least one of the estimated visibility area of the other agent, computed visibility state of the other agent, an estimated visibility area of the ego-agent, a computed visibility state of the ego-agent, an estimated collision risk between the ego-agent and the other agent, the planned behavior of the ego-agent, and the warning that the other agent is not aware of the ego-agent.

The program according to the second aspect, the non-transitory computer-readable storage medium according to the third aspect, the assistance system according to the fourth aspect, and the vehicle according to the fifth aspect provide corresponding advantageous solutions as discussed with regard to the embodiments of the method according to the first aspect. The description of the method of the first aspect is correspondingly valid for the program according to the second aspect, the non-transitory computer-readable storage medium according to the third aspect, the assistance system according to the fourth aspect, and the vehicle according to the fifth aspect.

FIG. 1 shows a simplified flowchart of a method according to an embodiment. The method of FIG. 1 is an example of the computer-implemented method of the first aspect. The description of the method of the first aspect is correspondingly valid for the method of FIG. 1.

The method of FIG. 1 is a computer-implemented method for assisting an ego-agent. As shown in FIG. 1, the method comprises, in a step 100, estimating a visibility area of another agent being present in an environment of the ego-agent. The method comprises, in a step 200 following the step 100, computing a visibility state of the other agent with regard to the ego-agent using the estimated visibility area of the other agent. The method comprises, in a step 300 following the step 200, estimating a collision risk between the ego-agent and the other agent using the computed visibility state of the other agent. The method comprises, in a step 400 following the step 300, planning a behavior of the ego-agent by minimizing a total cost for the behavior, wherein the total cost comprises the estimated collision risk. The method comprises, in a step 500 following the step 400, performing at least one of: informing the ego-agent on the estimated collision risk and/or the planned behavior of the ego-agent; outputting, dependent on the estimated collision risk, a warning that the other agent is not aware of the ego-agent; and controlling the ego-agent using the estimated collision risk and/or the planned behavior of the ego-agent.

The steps of the method may be performed at repeating time steps. That is, the method may be iteratively performed. The repeating time steps may be periodically repeating time steps.

Figure 2:
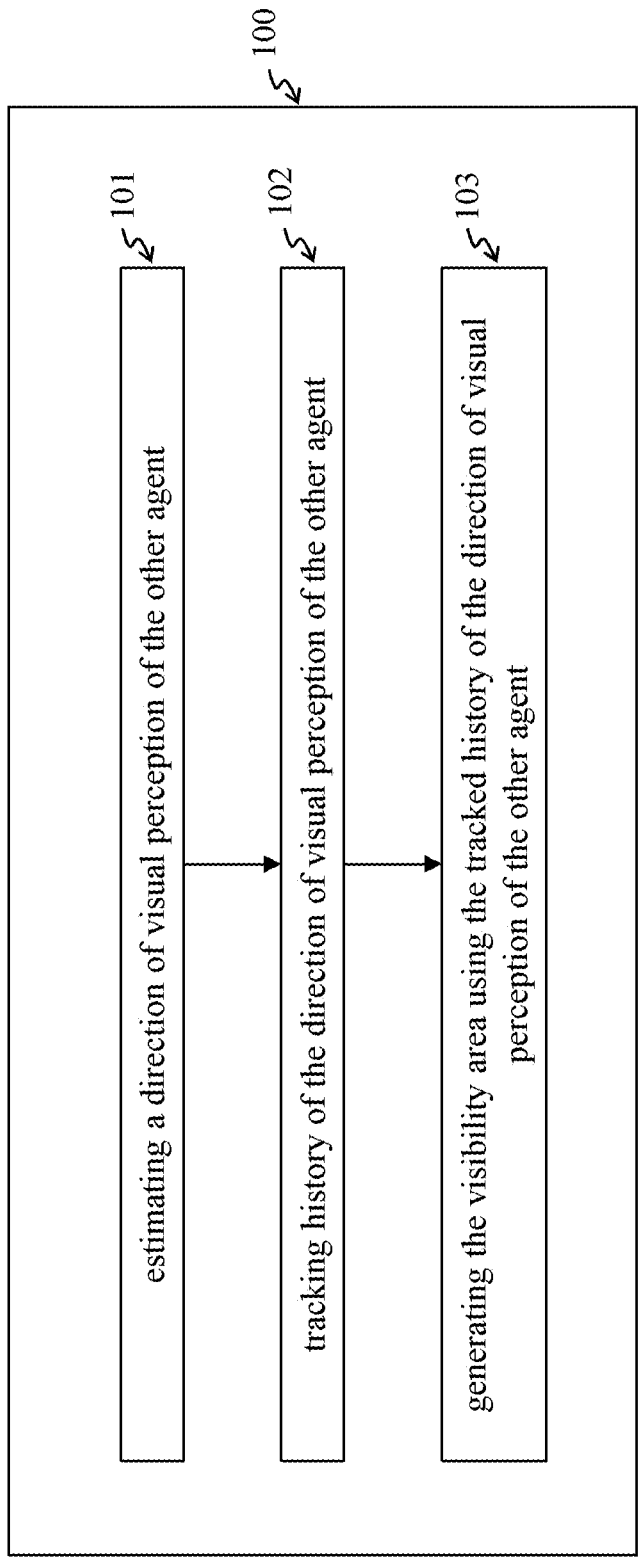
FIG. 2 shows an example of an implementation form of a step of a method according to an embodiment.

FIG. 2 shows an example of an implementation form of a step of a method according to an embodiment. Thus, FIG. 2 shows an example of an implementation form of the method of FIG. 1 and, thus, an example of an implementation form of the method of the first aspect. In particular, FIG. 2 shows an example of an implementation form of the step 100 of the method of FIG. 1.

As shown in FIG. 2, the step 100 of estimating the visibility area of the other agent may comprise: in a step 101, estimating a direction of visual perception of the other agent; in a step 102 following the step 101, tracking history of the direction of visual perception of the other agent; and, in a step 103 following the step 102, generating the visibility area using the tracked history of the direction of visual perception of the other agent.

Figure 3:
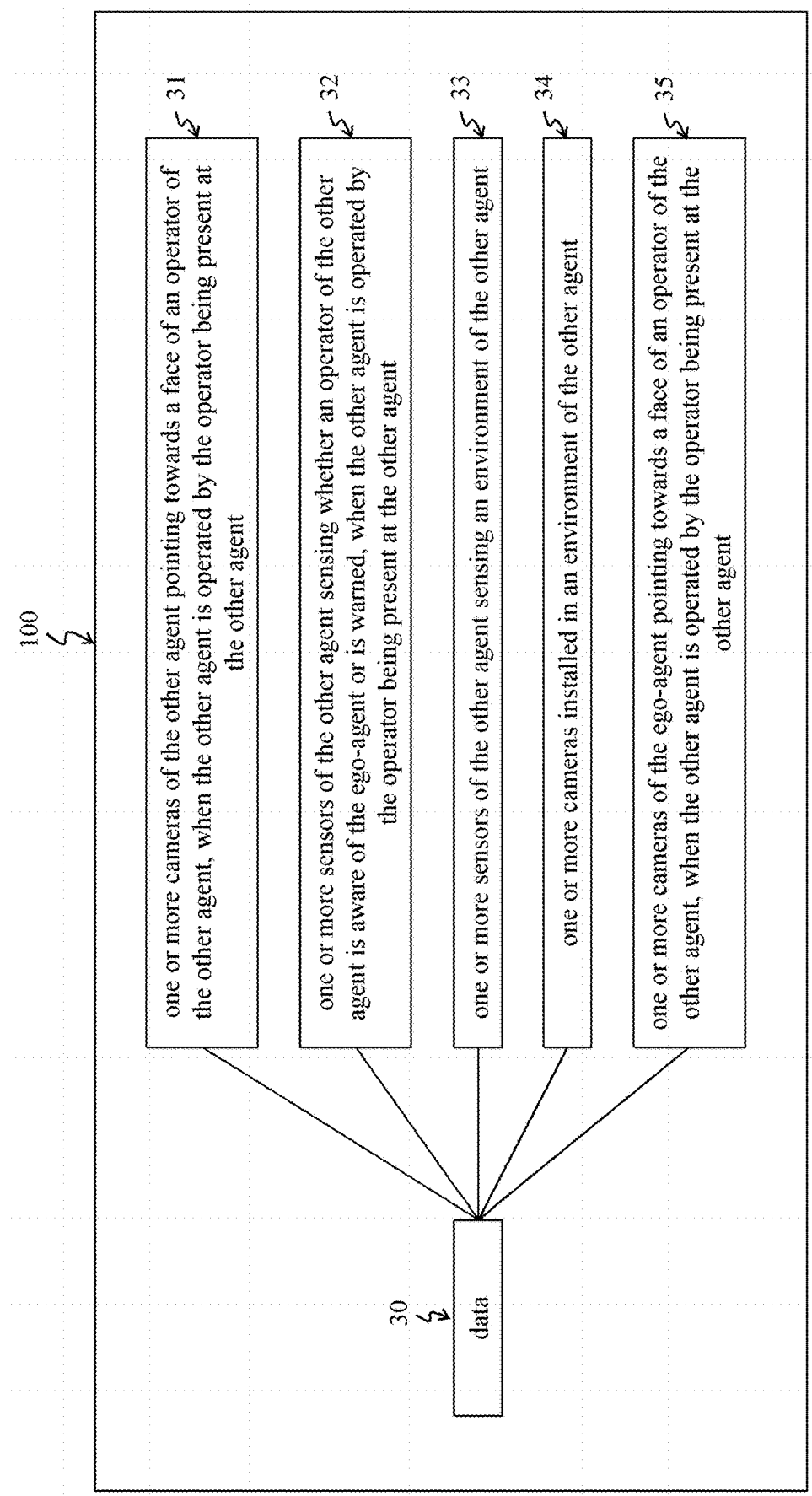
FIG. 3 shows an example of data usable in an implementation form of a step of a method according to an embodiment.

FIG. 3 shows an example of data usable in an implementation form of a step of a method according to an embodiment. Thus, FIG. 3 shows an example of data usable in an implementation form of the method of FIG. 1 and, thus, an example of data usable in an implementation form of the method of the first aspect. In particular, FIG. 3 shows an example of data usable in an implementation form of the step 100 of the method of FIG. 1.

As shown in FIG. 3, the step 100 of estimating the visibility area of the other agent may comprises using data 30. The data 30 may be data of at least one of one or more cameras 31 of the other agent pointing towards a face of an operator of the other agent, when the other agent is operated by the operator being present at the other agent; one or more sensors 32 of the other agent sensing whether an operator of the other agent is aware of the ego-agent or is warned, when the other agent is operated by the operator being present at the other agent; one or more sensors 33 of the other agent sensing an environment of the other agent, one or more cameras 34 installed in an environment of the other agent; and one or more cameras 35 of the ego-agent pointing towards a face of an operator of the other agent, when the other agent is operated by the operator being present at the other agent.

Figure 4A:
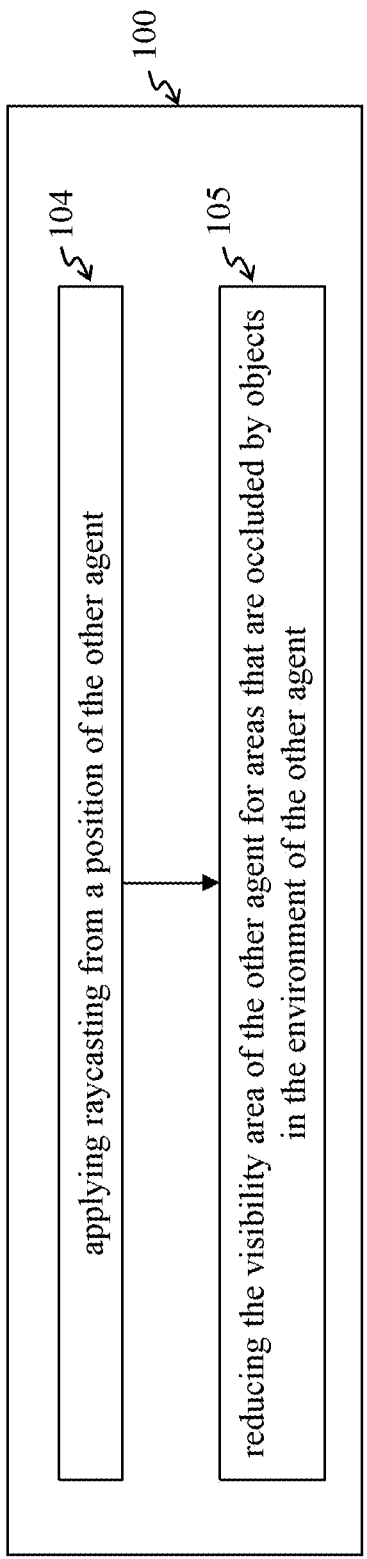
FIGS. 4A and 4B each show an example of an implementation form of a step of a method according to an embodiment.
Figure 4B:
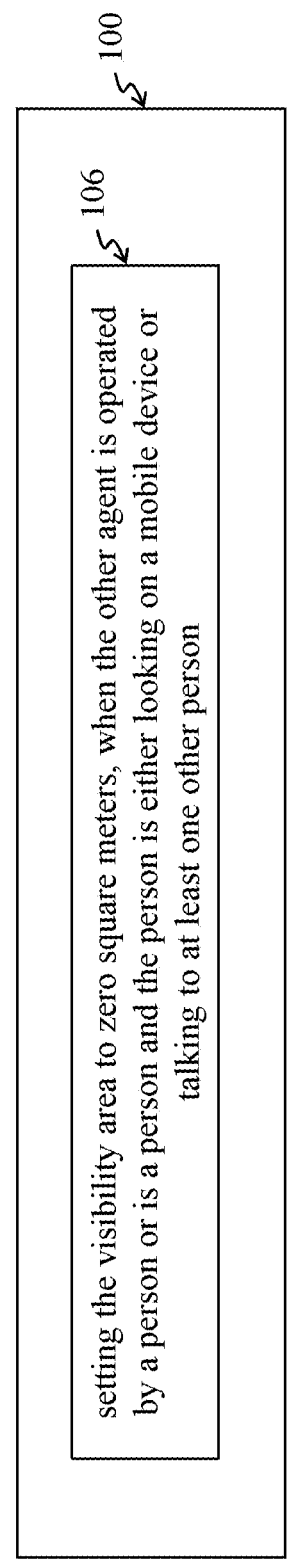

FIGS. 4A and 4B each show an example of an implementation form of a step of a method according to an embodiment. Thus, FIGS. 4A and 4B each show an example of an implementation form of the method of FIG. 1 and, thus, an example of an implementation form of the method of the first aspect. In particular, FIGS. 4A and 4B each show an example of an implementation form of the step 100 of the method of FIG. 1.

As shown in FIG. 4A, the step 100 of estimating the visibility area of the other agent may comprise: in a step 104, applying ray casting from a position of the other agent; and, in a step 105 following the step 104, reducing the visibility area of the other agent for areas that are occluded by objects in the environment of the other agent.

As shown in FIG. 4B, the step 100 of estimating the visibility area of the other agent may comprise the step 106 setting the visibility area to zero square meters, when the other agent is operated by a person or is a person and the person is either looking on a mobile device or talking to at least one other person.

Figure 5:
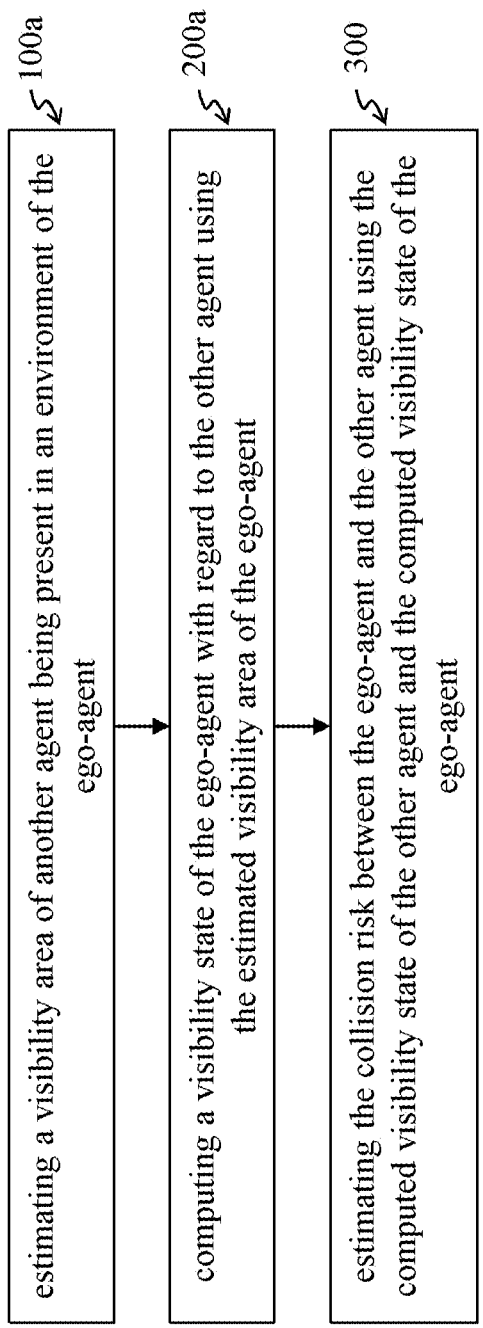
FIG. 5 shows optional steps of an example of an implementation form of a method according to an embodiment.

FIG. 5 shows optional steps of an example of an implementation form of a method according to an embodiment. Thus, FIG. 5 shows an example of optional steps in an implementation form of the method of FIG. 1 and, thus, an example of optional steps in an implementation form of the method of the first aspect.

As shown in FIG. 5, the method of FIG. 1 may optionally comprise: in a step 100a, estimating a visibility area of the ego-agent. The method may optionally comprise, in a step 200b following the step 100a, computing a visibility state of the ego-agent with regard to the other agent using the estimated visibility area of the ego-agent. The method may optionally comprise, in a step 300 following the step 200b, estimating the collision risk between the ego-agent and the other agent using the computed visibility state of the other agent and the computed visibility state of the ego-agent. The step 100a may be performed before one of the steps 100 and 200 of the method of FIG. 1, simultaneously with at least one of the steps 100 and 200 of the method of FIG. 1, or after the step 200 of the method of FIG. 1. The step 200a may be performed before one of the steps 100 and 200 of the method of FIG. 1, simultaneously with at least one of the steps 100 and 200 of the method of FIG. 1, or after the step 200 of the method of FIG. 1. In case the optional steps 100a and 200b are performed in addition to the steps 100 and 200 of the method of FIG. 1, the step 300 of FIG. 5 may replace the step 300 of the method of FIG. 1.

Figure 6:
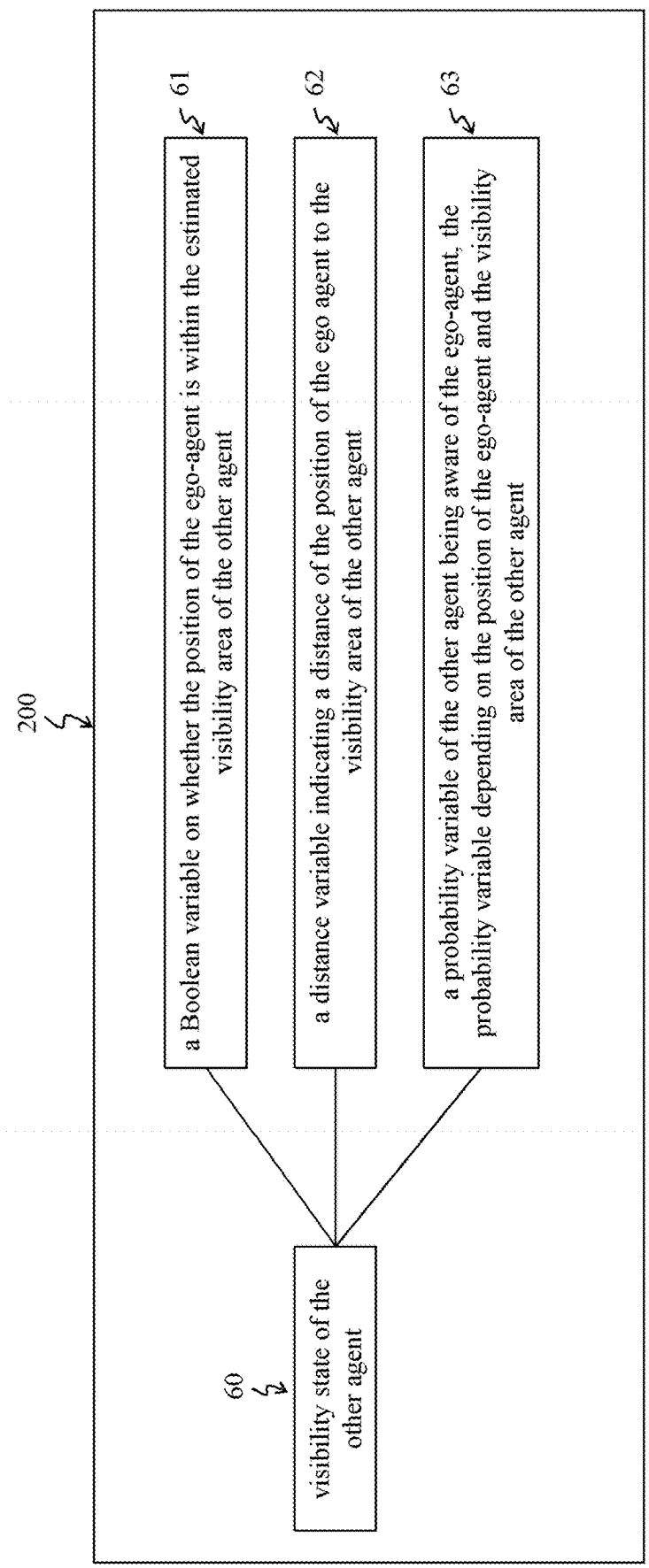
FIG. 6 shows an example of a visibility state of another agent that may be computed by an implementation form of a step of a method according to an embodiment.

FIG. 6 shows an example of a visibility state of another agent that may be computed by an implementation form of a step of a method according to an embodiment. Thus, FIG. 6 shows an example of a visibility state of another agent that may be computed by an implementation form of the method of FIG. 1 and, thus, an example of a visibility state of another agent that may be computed by an implementation form of the method of the first aspect. In particular, FIG. 6 shows an example of a visibility state of the other agent that may be computed in an implementation form of the step 200 of the method of FIG. 1.

As shown in FIG. 6, the visibility state 60 of the other agent that may be computed in the step 200 of FIG. 1 may comprise at least one of the following: a Boolean variable 61 on whether the position of the ego-agent is within the estimated visibility area of the other agent; a distance variable 62 indicating a distance of the position of the ego-agent to the visibility area of the other agent; and a probability variable 63 of the other agent being aware of the ego-agent, the probability variable depending on the position of the ego-agent and the visibility area of the other agent.

Figure 7A:
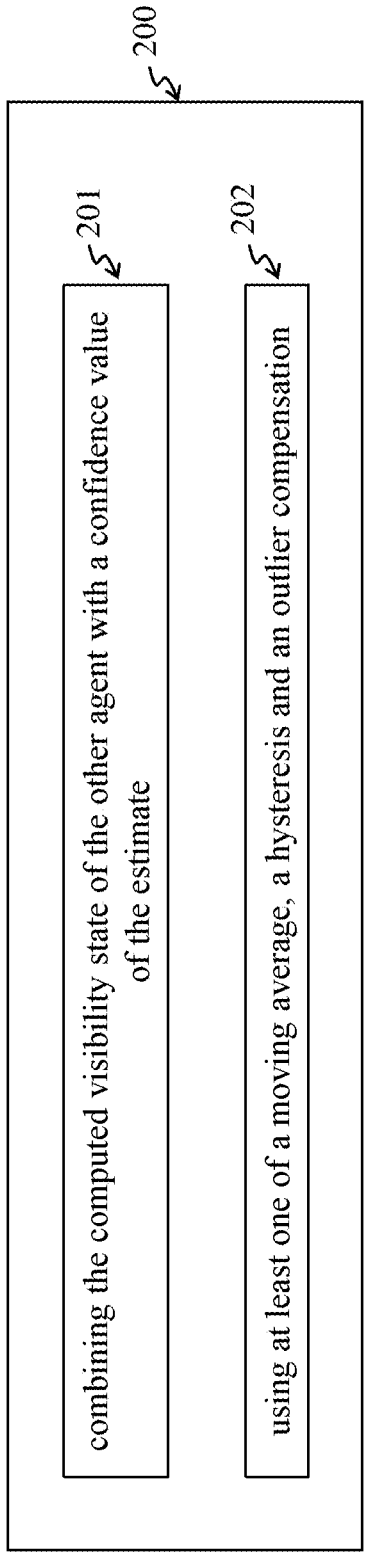
FIGS. 7A and 7B each show an example of an implementation form of a step of a method according to an embodiment.
Figure 7B:
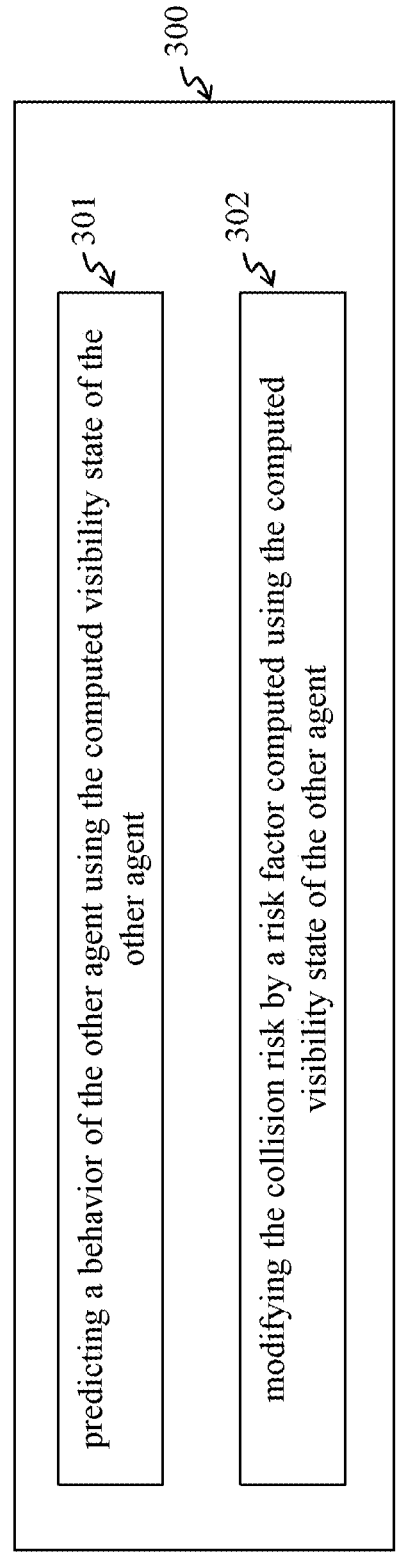

FIGS. 7A and 7B each show an example of an implementation form of a step of a method according to an embodiment; Thus, FIGS. 7A and 7B each show an example of an implementation form of the method of FIG. 1 and, thus, an example of an implementation form of the method of the first aspect. In particular, FIG. 7A shows an example of an implementation form of the step 200 of the method of FIG. 1, and FIG. 7B shows an example of an implementation form of the step 300 of the method of FIG. 1.

As shown in FIG. 7A, the step 200 of computing a visibility state of the other agent with regard to the ego-agent using the estimated visibility area of the other agent may comprises at least one of: a step 201 of combining the computed visibility state of the other agent with a confidence value of the estimate, and a step 202 of using at least one of a moving average, a hysteresis and an outlier compensation.

As shown in FIG. 7B, the step 300 of estimating a collision risk between the ego-agent and the other agent using the computed visibility state of the other agent comprises at least one of: a step 301 of predicting a behavior of the other agent using the computed visibility state of the other agent, and a step 302 of modifying the collision risk by a risk factor computed using the computed visibility state of the other agent.

Figure 8:
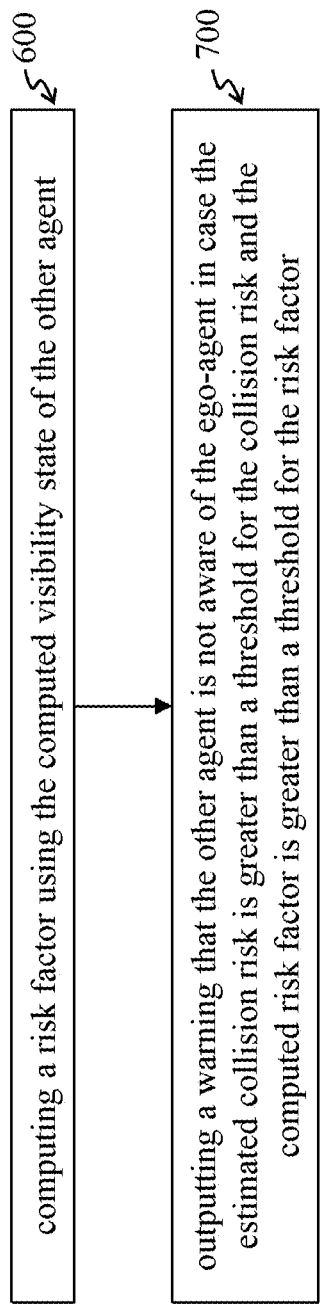
FIGS. 8 and 9 each show optional steps of an example of an implementation form of a method according to an embodiment.
Figure 9:
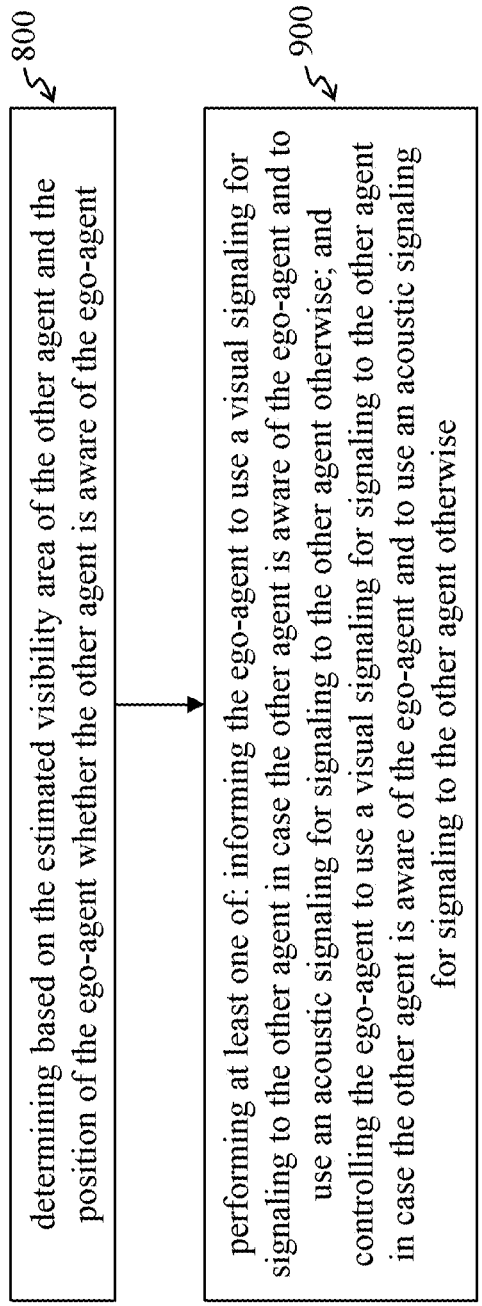

FIGS. 8 and 9 each show optional steps of an example of an implementation form of a method according to an embodiment. Thus, FIGS. 8 and 9 each show an example of optional steps in an implementation form of the method of FIG. 1 and, thus, an example of optional steps in an implementation form of the method of the first aspect.

As shown in FIG. 8, the method of FIG. 1 may optionally comprise: in a step 600, computing a risk factor using the computed visibility state of the other agent. The method may optionally comprise, in a step 700 following the step 600, outputting a warning that the other agent is not aware of the ego-agent in case the estimated collision risk is greater than a threshold for the collision risk and the computed risk factor is greater than a threshold for the risk factor. The optional step 600 may be performed after the step 200 of the method of FIG. 1. It may be performed simultaneously to at least one of the steps 300 to 500. The optional step 700 may be performed simultaneously to at least one of the steps 300 to 500.

As shown in FIG. 9, the method of FIG. 1 may optionally comprise: in a step 800, determining based on the estimated visibility area of the other agent and the position of the ego-agent whether the other agent is aware of the ego-agent. The method may optionally comprise, in a step 900 following the step 800, performing at least one of: informing the ego-agent to use a visual signaling for signaling to the other agent in case the other agent is aware of the ego-agent and to use an acoustic signaling for signaling to the other agent otherwise; and controlling the ego-agent to use a visual signaling for signaling to the other agent in case the other agent is aware of the ego-agent and to use an acoustic signaling for signaling to the other agent otherwise. The optional step 800 may be performed after the step 100 of the method of FIG. 1. It may be performed simultaneously to at least one of the steps 200 to 500. The optional step 900 may be performed simultaneously to at least one of the steps 200 to 500.

Figure 10:
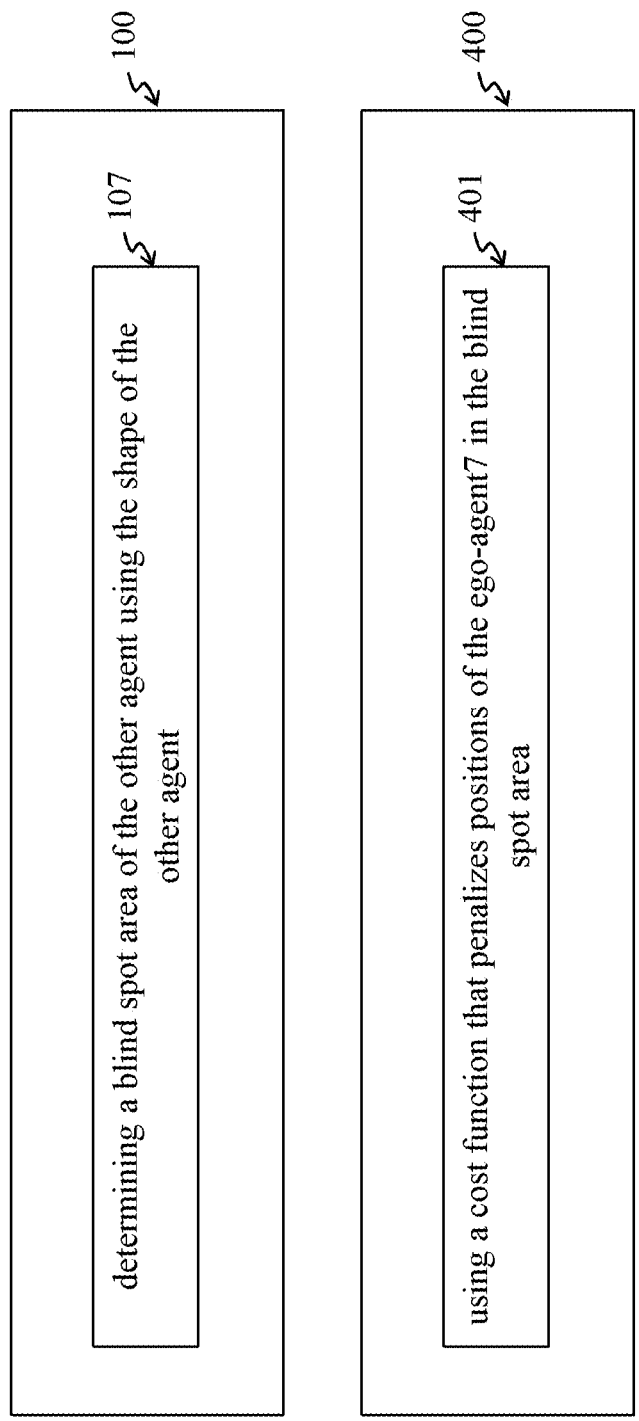
FIG. 10 shows an example of an implementation form of two steps of a method according to an embodiment.

FIG. 10 shows an example of an implementation form of two steps of a method according to an embodiment. Thus, FIG. 10 shows an example of an implementation form of the method of FIG. 1 and, thus, an example of an implementation form of the method of the first aspect. In particular, FIG. 10 shows an example of an implementation form of the steps 100 and 400 of the method of FIG. 1.

As shown in FIG. 10, the step 100 of estimating a visibility area of the other agent may comprise a step 107 of determining a blind spot area of the other agent using the shape of the other agent. The step 400 of planning a behavior of the ego-agent by minimizing the total cost for the behavior may comprise a step 401 of using a cost function that penalizes positions of the ego-agent in the blind spot area.

The optional features shown in FIGS. 2 to 10 may be combined in any way with each other and the steps of the method of FIG. 1.

Figure 11:
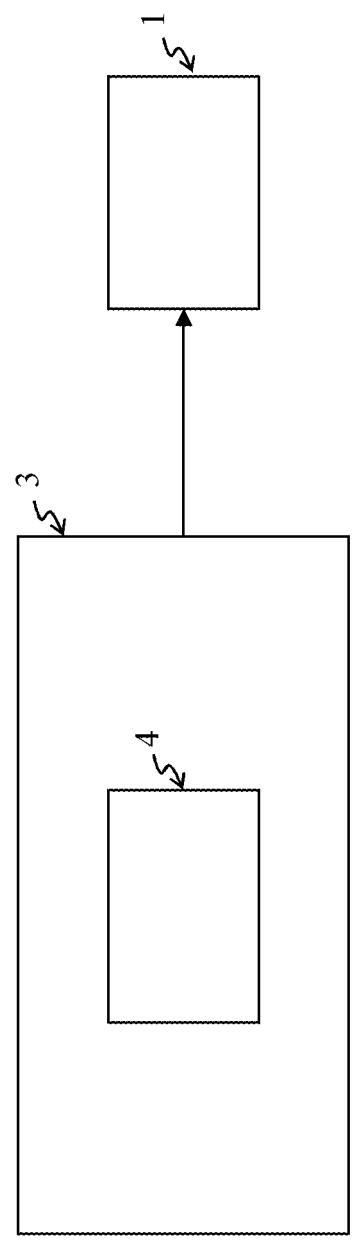
FIG. 11 shows an assistance system according to an embodiment.

FIG. 11 shows an assistance system according to an embodiment. The assistance system is an example of an assistance system according to the fourth aspect. The description of the assistance system of the fourth aspect is correspondingly valid for the assistance system of FIG. 11.

As shown in FIG. 11, the assistance system 3 is an assistance system for assisting an ego-agent 1. The system 3 comprise a processor 4. The processor 4 is configured to estimate a visibility area of another agent being present in an environment of the ego-agent. The processor 4 is configured to compute a visibility state of the other agent with regard to the ego-agent using the estimated visibility area of the other agent. The processor 4 is configured to estimate a collision risk between the ego-agent and the other agent using the computed visibility state of the other agent. The processor 4 is configured to plan a behavior of the ego-agent by minimizing a total cost for the behavior, wherein the total cost comprises the estimated collision risk. The processor 4 is configured to perform at least one of: informing the ego-agent on the estimated collision risk and/or the planned behavior of the ego-agent; outputting, dependent on the estimated collision risk, a warning that the other agent is not aware of the ego-agent; and controlling the ego-agent using the estimated collision risk and/or the planned behavior of the ego-agent.

Figure 12B:
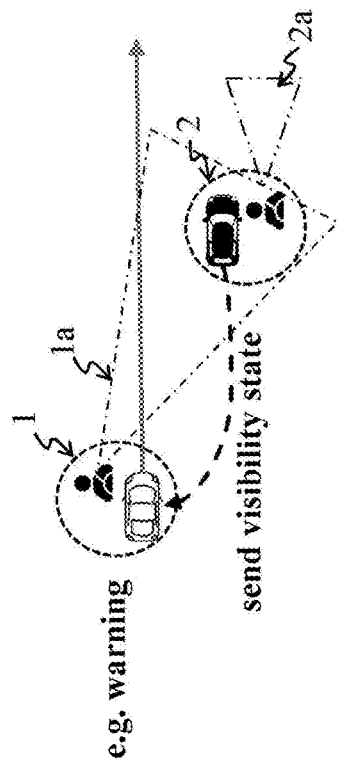
FIGS. 12A and 12B each show a use case of using an example of a method according to an embodiment.
Figure 12A:
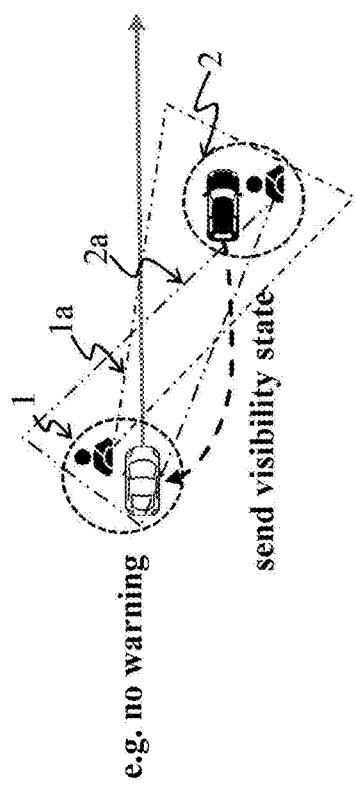

FIGS. 12A and 12B each show a use case of using an example of an implementation form of a method according to an embodiment. Thus, FIGS. 12A and 12B each show a use case of using an example of an implementation form of the method of FIG. 1 and, thus, an example of an implementation form of the method of the first aspect.

In the examples of FIGS. 12A and 12B the ego-agent 1 and the other agent 2 that is present in the environment of the ego-agent 1 are assumed to each be a car that is driven by a person. The following description is correspondingly valid in case the ego-agent 1 and/or the other agent 2 are a different vehicle. In FIGS. 12A and 12B the visibility area 1a of the ego-agent 1 and the visibility area 2a of the other agent 2 are shown. Since the ego-agent 1 and the other agent 2 are assumed to each be a car that is driven by a person, the visibility area and visibility state of the ego-agent 1 and the other agent 2 are the visibility area and visibility state of the respective person driving the ego-agent 1 or the other agent 2. According to the example of FIGS. 12A and 12B it is assumed that the ego-agent 1 and the other agent 2 drive in neighboring lanes of a road, wherein the other agent 2 drives in front of the ego-agent 1 in the direction of movement.

As shown in FIGS. 12A and 12B, the other agent 2 may send its visibility state (i.e., the visibility state of the other agent 2) to the ego-agent 1 (indicated by a dashed arrow). That is, the other agent 2 may be configured to estimate its visibility area 2a (i.e., the visibility area 2a of the other agent 2) and compute its visibility state (i.e., the visibility state of the other agent 2) with regard to the ego-agent 1 using its visibility area. For this, one or more cameras may be installed at the other agent that point towards the face of the person driving the other agent 2. The ego-agent 1 and the other agent 2 each may comprise a communication device for communicating with each other.

In the example of FIGS. 12A and 12B it is assumed that the person driving the ego-agent 1 looks in the direction of the other agent 2 and, thus, is aware of the other agent 2. This is indicated by the visibility area 1a of the ego-agent 1 encompassing the other agent 2. In the example of FIG. 12A, it is assumed that the driver of the other agent 2 looks in the direction of the ego-agent 1, e.g., because the driver wants to change lane and, thus, looks to the back, and, thus, is aware of the ego-agent 1. This is indicated by the visibility area 2a of the other agent 2 encompassing the ego-agent 1 as shown in FIG. 12A. In the example of FIG. 12B, it is assumed that the driver of the other agent 2 does not look in the direction of the ego-agent 1 and, thus, is not aware of the ego-agent 1. This is indicated by the visibility area 2a of the other agent 2 that does not encompass the ego-agent 1 as shown in FIG. 12B.

The ego-agent 1 may perform the step 300 of the method of FIG. 1 using the received visibility state of the other agent 2 and the step 400 of the method of FIG. 1. In addition or alternatively, the visibility state of the other agent 2 may be sent to an autonomous system that may perform the steps 300 and 400 of the method of FIG. 1. Since, in the example of FIG. 12A the computed visibility state indicates that the driver of the other agent 2 is aware of the ego-agent 1 the collision risk between the ego-agent and the other agent 2 will be less compared to the example of FIG. 12B, where the computed visibility state indicates that the driver of the other agent 2 is not aware of the ego-agent. The estimated collision risk may depend on one or more further criteria. For example, in case the ego-agent 1 drives with a higher velocity and the other agent 2 plans to change to the lane of the ego-agent the collision risk between the ego-agent 1 and the other agent 2 is higher compared to a case where the ego-agent 1 drives with a lower velocity.

As shown in FIG. 12B, a warning that the other agent 2 is not aware of the ego-agent may be output, dependent on the estimated collision risk, to the driver of the ego-vehicle 1. Since, in the example of FIG. 12A the driver of the other agent 2 is aware of the ego-agent 1 no such warning may be output.

The ego-agent 1 and the other agent 2 may be configured to perform any combination of the features of any of FIGS. 1 to 10. For further details on optional features, e.g., method steps that may be performed or implementation features, of the ego-agent 1 and the other agent 2 reference is made to the description of the method according to the first aspect.

Figure 13B:
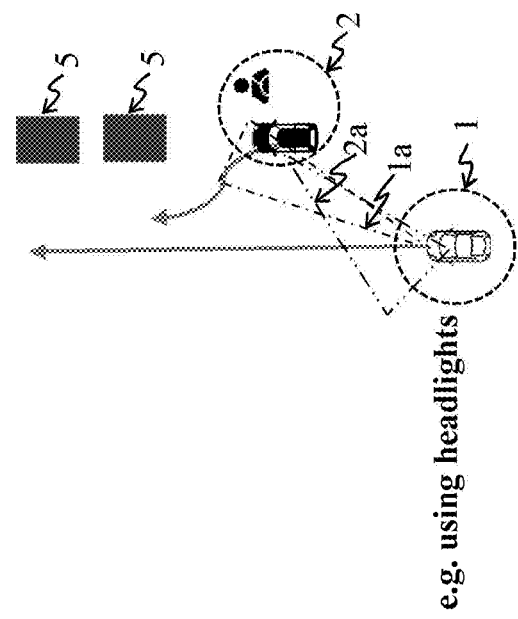
FIGS. 13A and 13B each show a use case of using an example of a method according to an embodiment.
Figure 13A:
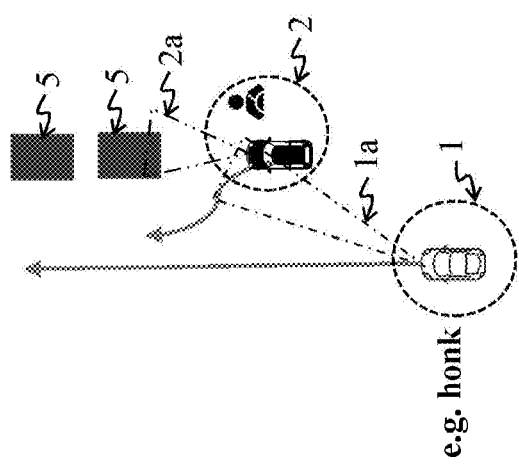

FIGS. 13A and 13B each show a use case of using an example of an implementation form of a method according to an embodiment. Thus, FIGS. 13A and 13B each show a use case of using an example of an implementation form of the method of FIG. 1 and, thus, an example of an implementation form of the method of the first aspect.

In the examples of FIGS. 13A and 13B the ego-agent 1 is assumed to be an autonomous driving (AD) car and the other agent 2 that is present in the environment of the ego-agent 1 is assumed to be a car that is driven by a person. The following description is correspondingly valid in case the ego-agent 1 and/or the other agent 2 are a different vehicle. In FIGS. 13A and 13B the visibility area 1a of the ego-agent 1 and the visibility area 2a of the other agent 2 are shown. Since the ego-agent 1 is assumed to be an AD car, the visibility area of the ego-agent 1 is the visibility area provided by one or more sensors of the AD car for providing visual perception of an environment of the AD car to the control entity of the AD car. The control entity may comprise one or more control devices on board of the AD car and/or one or more external control devices, e.g., an autonomous system. Since the other agent 2 is assumed to be a car that is driven by a person, the visibility area and visibility state of the other agent 2 is the visibility area and visibility state of the person driving the other agent 2.

According to the example of FIGS. 13A and 13B it is assumed that the ego-agent 1 and the other agent 2 are in neighboring lanes of a road, wherein the other agent 2 is in front of the ego-agent 1 in the direction of movement and the other agent 2 cannot move forward due to parked vehicles 5.

The other agent 2 may send its visibility state (i.e., the visibility state of the other agent 2) to the ego-agent 1. That is, the other agent 2a may be configured to estimate its visibility area 2a (i.e., the visibility area 2a of the other agent 2) and compute its visibility state (i.e., the visibility state of the other agent 2) with regard to the ego-agent 1 using its visibility area. For this, one or more cameras may be installed at the other agent 2 that point towards the face of the person driving the other agent 2. The ego-agent 1 and the other agent 2 each may comprise a communication device for communicating with each other.

In the example of FIGS. 13A and 13B it is assumed that the one or more sensors of the AD system of the ego-agent 1 perceive the other agent 2 and, thus, the AD system of the ego-agent 1 is aware of the other agent 2. This is indicated by the visibility area 1a of the ego-agent 1 at least partly encompassing the other agent 2. In the example of FIG. 13A, it is assumed that the driver of the other agent 2 does not look in the direction of the ego-agent 1 and, thus, is not aware of the ego-agent 1. This is indicated by the visibility area 2a of the other agent 2 that does not encompass the ego-agent 1 as shown in FIG. 13A. In the example of FIG. 13B, it is assumed that the driver of the other agent 2 looks in the direction of the ego-agent 1, e.g., because the driver wants to change lane and, thus, looks to the back, and, thus, is aware of the ego-agent 1. This is indicated by the visibility area 2a of the other agent 2 at least partly encompassing the ego-agent 1 as shown in FIG. 13B.

The ego-agent 1, i.e., its AD system, may perform the step 300 of the method of FIG. 1 using the received visibility state of the other agent 2 and the step 400 of the method of FIG. 1. Since, in the example of FIG. 13B the computed visibility state indicates that the driver of the other agent 2 is aware of the ego-agent 1 the collision risk between the ego-agent and the other agent 2 will be less compared to the example of FIG. 13A, where the computed visibility state indicates that the driver of the other agent 2 is not aware of the ego-agent 1.

Sharing the visibility state of the other agent 2 with the ego-agent 1 allows improving the AD function of the ego-agent 1. Namely, the AD system of the ego-agent 1 may use this information, i.e., whether the other agent 2 is aware of the ego-agent 1 or not, for signaling to the driver of the other agent 2 that it may go first and change to the lane of the ego-agent 1 in order to move around the parking vehicles 5. For example, since in the example of FIG. 13A, the visibility state of the other agent 2 indicates that the driver of the other agent 2 is not aware of the ego-agent 1 because the driver 2 does not look in the direction of the ego-agent 1, the AD system may use an acoustic signaling, e.g., a honk, for singling to the driver of the other agent 2 that it may go first and change the line. Since in the example of FIG. 13B, the visibility state of the other agent 2 indicates that the driver of the other agent 2 is aware of the ego-agent 1, the AD system may use a visual signal, e.g., the headlights of the car, for signal to the driver of the other agent 2 that it may go first and change the lane.

The aforementioned behavior of signaling may be achieved by controlling the behavior using a cost function and minimizing the cost function, wherein a behavior cost using the headlight signal is small ($cost_{headlight} \rightarrow 0$) when the visibility state of the other agent 2 indicates that the driver of the other agent 2 is aware of the ego-agent 1, and a behavior cost using the honk signal is small ($cost_{honk} \rightarrow 0$) when the visibility state of the other agent 2 indicates that the driver of the other agent 2 is not aware of the ego-agent 1.

The ego-agent 1 and the other agent 2 may be configured to perform any combination of the features of any of FIGS. 1 to 10. For further details on optional features, e.g., method steps that may be performed or implementation features, of the ego-agent 1 and the other agent 2 reference is made to the description of the method according to the first aspect.

Figure 14C:
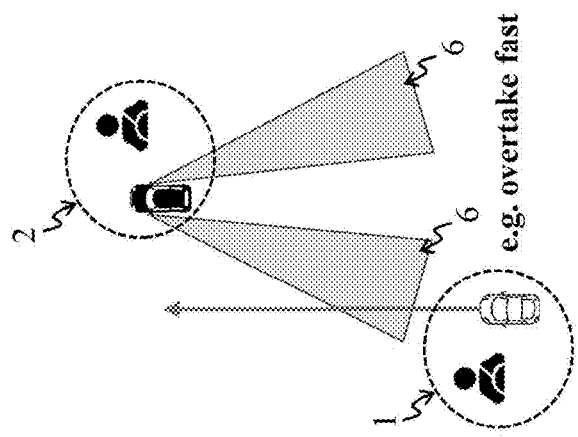
FIGS. 14A, 14B and 14C each show a use case of using an example of a method according to an embodiment.
Figure 14B:
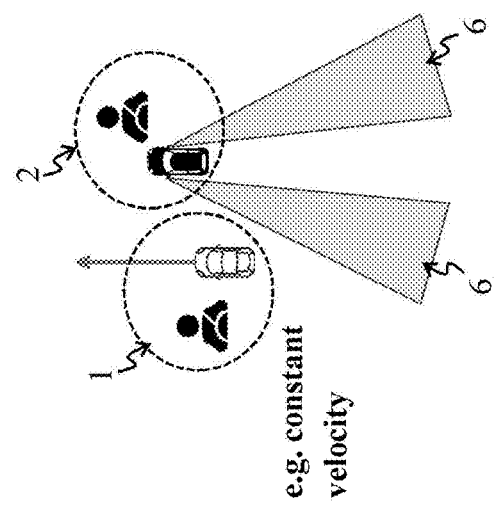
Figure 14A:
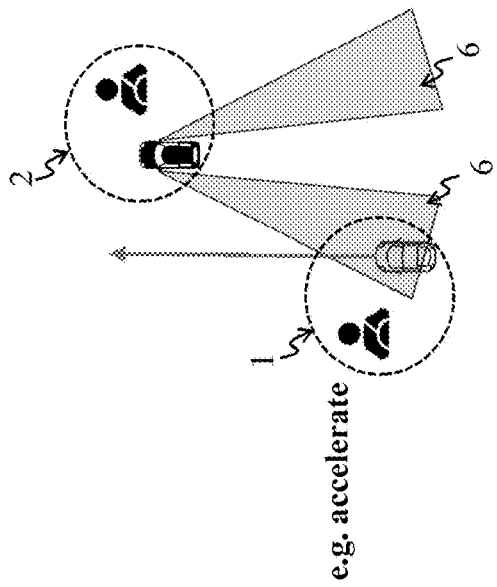

FIGS. 14A, 14B and 14C each show a use case of using an example of an implementation form of a method according to an embodiment. Thus, FIGS. 14A, 14B and 14C each show a use case of using an example of an implementation form of the method of FIG. 1 and, thus, an example of an implementation form of the method of the first aspect. The ego-agent 1 and the other agent 2 may correspond to the ego-agent 1 and the other agent 2 of FIGS. 12A and 12B. Thus, the description of FIGS. 12A and 12B may be correspondingly valid for the ego-agent 1 and the other agent 2 of FIGS. 14A, 14B and 14C and in the following mainly an optional feature is described.

The ego-agent 1 may estimate a visibility area of the other agent 2 by determining a blind spot area 6 of the other agent 2 using the shape of the other agent 2. The ego-agent 1 may plan its behavior (i.e., the behavior of the ego-agent 1) by performing the step 400 of the method of FIG. 1. For performing the step 400 of FIG. 1 the ego-agent 1 may use a cost function that penalizes positions of the ego-agent 1 in the blind spot area 6 of the other agent 2. For example, the ego-agent 1 may use an additional zone risk in the cost function of a behavior planner of the ego-agent 1 that penalizes positions of the ego-agent 1 in the blind spot area 6 of the other agent 2. Therefore, the behavior planner of the ego-vehicle 1 may be configured to plan the behavior of the ego-vehicle 1 such that positions of the ego-vehicle 1 in the blind spot area 6 of the other agent 2 are avoided. For example, a cost $R_{zone}(\text{trajectory})$ for a certain trajectory along which the ego-vehicle 1 is to move may be one in case the position $pos_{ego}(\text{trajectory})$ of the ego-vehicle 1 moving along said trajectory is within the blind spot area 6, and zero otherwise. This may be formulated as follows:

$$R_{Zone}(\text{trajectory}) = \begin{cases} 1, & \text{if } pos_{ego}(\text{trajectory}) \in \text{blind spot area}_{other} \\ 0, & \text{elsewhere} \end{cases}$$

In the use case of FIGS. 14A, 14B and 14C a visibility state of the other agent 2 does not necessarily be sent from the other agent 2. The visibility state of the other agent 2 may be derived by the ego-agent 1 based on the shape of the other agent 2.

Thus, since in the example of FIG. 14A the ego-agent is in the blind spot area 6 of the other agent 2, the driver of the ego-agent 1 may be informed on this and asked to accelerate to bring the ego-agent 1 out of the blind spot area 6 of the other agent 2 or the ego-agent 1 may be controlled to autonomously accelerate to move out of the blind spot area 6 of the other agent 2. Since in the example of FIG. 14B the ego-agent 1 is outside of the blind spot area 6 of the other agent 2, the driver of the ego-agent 1 may be informed on this and asked to drive the ego-agent 1 at constant velocity in order to stay out of the blind spot area 6 of the other agent 2 or the ego-agent 1 may be controlled to autonomously move at the constant velocity to stay out of the blind spot area 6 of the other agent 2. Since in the example of FIG. 14C the ego-agent 1 plans to move through the blind spot area 6 of the other agent 2 (indicated by the arrow) the driver of the ego-agent 1 may be informed on this and asked to quickly overtake the other agent 2 in order to be a minimum amount of time in the blind spot area 6 of the other agent 2 or the ego-agent 1 may be controlled to quickly overtake the other agent 2 in order to be a minimum amount of time in the blind spot area 6 of the other agent 2.

The ego-agent 1 and the other agent 2 may be configured to perform any combination of the features of any of FIGS. 1 to 10. For further details on optional features, e.g., method steps that may be performed or implementation features, of the ego-agent 1 and the other agent 2 reference is made to the description of the method according to the first aspect.

For further details on the assistance system of FIG. 11 and the method used in the use case of any one of FIGS. 12A, 12B, 13A, 13B, 14A, 14B, and 14C reference is made to the description of the method according to the first aspect as well as the description of the previous Figures.

All steps which are performed by the various entities described in the present disclosure as well as the functionalities described to be performed by the various entities are intended to mean that the respective entity is adapted to or configured to perform the respective steps and functionalities. In the claims as well as in the description the word "comprising" does not exclude the presence of other elements or steps.

The indefinite article "a" or "an" does not exclude a plurality. A single element or other unit may fulfill the functions of several entities or items recited in the claims. The mere fact that different dependent claims recite certain measures and features of the computer-implemented method for assisting an ego-agent does not exclude that a combination of these measures and features cannot be combined in an advantageous implementation.

What is claimed is:

1. A computer-implemented method for assisting an ego-agent, the method comprising:
   estimating a visibility area of another agent being present in an environment of the ego-agent, wherein estimating the visibility area of the other agent comprises
      estimating a direction of visual perception of the other agent,
      tracking history of the direction of visual perception of the other agent, and
      generating the visibility area using the tracked history of the direction of visual perception of the other agent;

computing a visibility state of the other agent with regard to the ego-agent using the estimated visibility area of the other agent;

estimating a collision risk between the ego-agent and the other agent using the computed visibility state of the other agent;

planning a behavior of the ego-agent by minimizing a total cost for the behavior, wherein the total cost comprises the estimated collision risk; and performing at least one of:
informing the ego-agent on the estimated collision risk and/or the planned behavior of the ego-agent,
outputting, dependent on the estimated collision risk, a warning that the other agent is not aware of the ego-agent, and
controlling the ego-agent using the estimated collision risk and/or the planned behavior of the ego-agent.

2. The method according to claim 1, wherein estimating the visibility area of the other agent comprises using data of at least one of:
one or more cameras of the other agent pointing towards a face of an operator of the other agent, when the other agent is operated by the operator being present at the other agent;
one or more sensors of the other agent sensing whether an operator of the other agent is aware of the ego-agent or is warned, when the other agent is operated by the operator being present at the other agent;
one or more sensors of the other agent sensing an environment of the other agent,
one or more cameras installed in an environment of the other agent; and
one or more cameras of the ego-agent pointing towards a face of an operator of the other agent, when the other agent is operated by the operator being present at the other agent.

3. The method according to claim 1, wherein estimating the visibility area of the other agent comprises:
applying ray casting from a position of the other agent; and
reducing the visibility area of the other agent for areas that are occluded by objects in the environment of the other agent.

4. The method according to claim 1, wherein estimating the visibility area of the other agent comprises:
setting the visibility area to zero square meters, when the other agent is operated by a person or is a person and the person is either looking on a mobile device or talking to at least one other person.

5. The method according to claim 1, the method comprises:
estimating a visibility area of the ego-agent;
computing a visibility state of the ego-agent with regard to the other agent using the estimated visibility area of the ego-agent; and
estimating the collision risk between the ego-agent and the other agent using the computed visibility state of the other agent and the computed visibility state of the ego-agent.

6. The method according to claim 1, wherein the visibility state of the other agent may comprise at least one of the following:
a Boolean variable on whether the position of the ego-agent is within the estimated visibility area of the other agent,
a distance variable indicating a distance of the position of the ego-agent to the visibility area of the other agent, and
a probability variable of the other agent being aware of the ego-agent, the probability variable depending on the position of the ego-agent and the visibility area of the other agent.

7. The method according to claim 1, wherein computing a visibility state of the other agent with regard to the ego-agent using the estimated visibility area of the other agent comprises at least one of:
combining the computed visibility state of the other agent with a confidence value of the estimate, and
using at least one of a moving average, a hysteresis and an outlier compensation.

8. The method according to claim 1, wherein estimating a collision risk between the ego-agent and the other agent using the computed visibility state of the other agent comprises at least one of:
predicting a behavior of the other agent using the computed visibility state of the other agent, and
modifying the collision risk by a risk factor computed using the computed visibility state of the other agent.

9. The method according to claim 1, wherein the method comprises:
computing a risk factor using the computed visibility state of the other agent, and
outputting a warning that the other agent is not aware of the ego-agent in case the estimated collision risk is greater than a threshold for the collision risk and the computed risk factor is greater than a threshold for the risk factor.

10. The method according to claim 1, wherein the method comprises:
determining based on the estimated visibility area of the other agent and the position of the ego-agent whether the other agent is aware of the ego-agent; and
performing at least one of:
informing the ego-agent to use a visual signaling for signaling to the other agent in case the other agent is aware of the ego-agent and to use an acoustic signaling for signaling to the other agent otherwise; and
controlling the ego-agent to use a visual signaling for signaling to the other agent in case the other agent is aware of the ego-agent and to use an acoustic signaling for signaling to the other agent otherwise.

11. The method according to claim 1, wherein
estimating a visibility area of the other agent comprises determining a blind spot area of the other agent using the shape of the other agent, and
planning a behavior of the ego-agent by minimizing the total cost for the behavior comprises using a cost function that penalizes positions of the ego-agent in the blind spot area.

12. The method according to claim 1, wherein
informing the ego-agent and/or outputting the warning is performed using a human machine interface, HMI.

13. The method according to claim 1, wherein
informing the ego-agent and/or outputting the warning may be performed in at least one of a visual way, acoustic way and a way affecting the tactile sense.

14. The method according to claim 1, wherein
the warning may be performed such that a warning modality and/or strength of a warning signaling depends on the estimated collision risk.

15. A program comprising program-code means for executing a method for assisting an ego-agent, when the program is executed on a computer or digital signal processor, wherein the method comprises:
  estimating a visibility area of another agent being present in an environment of the ego-agent, wherein estimating the visibility area of the other agent comprises
    estimating a direction of visual perception of the other agent,
    tracking history of the direction of visual perception of the other agent, and
    generating the visibility area using the tracked history of the direction of visual perception of the other agent;
  computing a visibility state of the other agent with regard to the ego-agent using the estimated visibility area of the other agent;
  estimating a collision risk between the ego-agent and the other agent using the computed visibility state of the other agent;
  planning a behavior of the ego-agent by minimizing a total cost for the behavior, wherein the total cost comprises the estimated collision risk; and
  performing at least one of:
    informing the ego-agent on the estimated collision risk and/or the planned behavior of the ego-agent,
    outputting, dependent on the estimated collision risk, a warning that the other agent is not aware of the ego-agent, and
    controlling the ego-agent using the estimated collision risk and/or the planned behavior of the ego-agent.

16. A non-transitory computer-readable storage medium embodying a program of machine-readable instructions executable by a digital processing apparatus, which cause the digital processing apparatus to perform:
  estimating a visibility area of another agent being present in an environment of an ego-agent, wherein estimating the visibility area of the other agent comprises
    estimating a direction of visual perception of the other agent,
    tracking history of the direction of visual perception of the other agent, and
    generating the visibility area using the tracked history of the direction of visual perception of the other agent;
  computing a visibility state of the other agent with regard to the ego-agent using the estimated visibility area of the other agent;
  estimating a collision risk between the ego-agent and the other agent using the computed visibility state of the other agent;
  planning a behavior of the ego-agent by minimizing a total cost for the behavior, wherein the total cost comprises the estimated collision risk; and
  performing at least one of:
    informing the ego-agent on the estimated collision risk and/or the planned behavior of the ego-agent,
    outputting, dependent on the estimated collision risk, a warning that the other agent is not aware of the ego-agent, and
    controlling the ego-agent using the estimated collision risk and/or the planned behavior of the ego-agent.

17. An assistance system for assisting an ego-agent, the system comprises a processor configured to:
  estimate a visibility area of another agent being present in an environment of the ego-agent, wherein estimating the visibility area of the other agent comprises
    estimating a direction of visual perception of the other agent,
    tracking history of the direction of visual perception of the other agent, and
    generating the visibility area using the tracked history of the direction of visual perception of the other agent;
  compute a visibility state of the other agent with regard to the ego-agent using the estimated visibility area of the other agent;
  estimate a collision risk between the ego-agent and the other agent using the computed visibility state of the other agent;
  plan a behavior of the ego-agent by minimizing a total cost for the behavior, wherein the total cost comprises the estimated collision risk; and
  perform at least one of:
    informing the ego-agent on the estimated collision risk and/or the planned behavior of the ego-agent,
    outputting, dependent on the estimated collision risk, a warning that the other agent is not aware of the ego-agent, and
    controlling the ego-agent using the estimated collision risk and/or the planned behavior of the ego-agent.

18. The assistance system according to claim 17, wherein the assistance system is configured to assist an operator of the ego-agent, in case the ego-agent is a vehicle being operated by the operator.

19. A vehicle including an assistance system for assisting an ego-agent, the system comprises a processor configured to:
  estimate a visibility area of another agent being present in an environment of the ego-agent, wherein estimating the visibility area of the other agent comprises
    estimating a direction of visual perception of the other agent,
    tracking history of the direction of visual perception of the other agent, and
    generating the visibility area using the tracked history of the direction of visual perception of the other agent;
  compute a visibility state of the other agent with regard to the ego-agent using the estimated visibility area of the other agent;
  estimate a collision risk between the ego-agent and the other agent using the computed visibility state of the other agent;
  plan a behavior of the ego-agent by minimizing a total cost for the behavior, wherein the total cost comprises the estimated collision risk; and
  perform at least one of:
    informing the ego-agent on the estimated collision risk and/or the planned behavior of the ego-agent,
    outputting, dependent on the estimated collision risk, a warning that the other agent is not aware of the ego-agent, and
    controlling the ego-agent using the estimated collision risk and/or the planned behavior of the ego-agent.

* * * * *